(12) United States Patent
Sawada

(10) Patent No.: US 7,580,820 B2
(45) Date of Patent: Aug. 25, 2009

(54) VEHICLE CONTROL INFORMATION CONVEYANCE STRUCTURE, VEHICLE CONTROL DEVICE USING THE CONVEYANCE STRUCTURE, AND VEHICLE CONTROL SIMULATOR USING THE CONVEYANCE STRUCTURE

(75) Inventor: Mamoru Sawada, Yokkaichi (JP)

(73) Assignee: Denso Corporation, Kariya (JP)

( * ) Notice: Subject to any disclaimer, the term of this patent is extended or adjusted under 35 U.S.C. 154(b) by 689 days.

(21) Appl. No.: 10/515,382

(22) PCT Filed: Jun. 19, 2003

(86) PCT No.: PCT/JP03/07836

§ 371 (c)(1),
(2), (4) Date: Nov. 23, 2004

(87) PCT Pub. No.: WO04/000598

PCT Pub. Date: Dec. 31, 2003

(65) Prior Publication Data

US 2005/0240319 A1    Oct. 27, 2005

(30) Foreign Application Priority Data

Jun. 24, 2002    (JP)    ............................ 2002-182928

(51) Int. Cl.
*G06G 7/48*    (2006.01)
(52) U.S. Cl. ................ 703/8; 701/93; 701/96; 701/36; 701/65; 701/48
(58) Field of Classification Search ...... 701/1, 701/33, 48, 29, 85; 340/3.1, 995.13; 455/466; 700/86; 303/139; 713/323
See application file for complete search history.

(56) References Cited

U.S. PATENT DOCUMENTS

| | | | | |
|---|---|---|---|---|
| 4,767,588 A | * | 8/1988 | Ito | ............................. 701/41 |
| 4,843,557 A | * | 6/1989 | Ina et al. | ..................... 701/114 |
| 5,121,324 A | * | 6/1992 | Rini et al. | ................... 701/105 |
| 5,351,776 A | * | 10/1994 | Keller et al. | .................. 701/70 |

(Continued)

FOREIGN PATENT DOCUMENTS

DE    100 25 037 A1    11/2001

(Continued)

OTHER PUBLICATIONS

Office Action from European Patent Office dated Jun. 2, 2009, pp. 1-6.

*Primary Examiner*—Hugh Jones
*Assistant Examiner*—Cuong V Luu
(74) *Attorney, Agent, or Firm*—Oliff & Berridge, PLC

(57) ABSTRACT

A control information conveyance structure comprises: a cognition-system control platform which recognizes the circumstances of the surroundings of a vehicle and generates a control space; an operation-system control platform which recognizes the circumstances related to the movement of the vehicle body and generates a control space; and a determination-system control platform which generates a determination control space based on information from the cognition-system and operation-system control platforms. The conveyance structure is constituted so that sensors and individual control devices belong to either or both of the control platforms. This control information conveyance structure is adopted. Thus, control platforms of such a control structure that the individual control devices are managed at a higher level can be provided.

25 Claims, 11 Drawing Sheets

U.S. PATENT DOCUMENTS

| | | | | |
|---|---|---|---|---|
| 5,504,482 | A * | 4/1996 | Schreder | 340/995.13 |
| 5,508,689 | A * | 4/1996 | Rado et al. | 340/3.1 |
| 5,526,264 | A * | 6/1996 | Niggemann et al. | 701/76 |
| 5,611,753 | A * | 3/1997 | Kondo et al. | 477/118 |
| 5,648,898 | A * | 7/1997 | Moore-McKee et al. | 700/86 |
| 5,659,304 | A * | 8/1997 | Chakraborty | 340/903 |
| 5,732,380 | A * | 3/1998 | Iwata | 701/85 |
| 5,832,397 | A * | 11/1998 | Yoshida et al. | 701/29 |
| 5,890,080 | A * | 3/1999 | Coverdill et al. | 701/29 |
| 5,941,925 | A * | 8/1999 | Hess et al. | 701/91 |
| 5,987,364 | A | 11/1999 | Le Gusquet et al. | |
| 5,995,895 | A * | 11/1999 | Watt et al. | 701/50 |
| 6,009,374 | A | 12/1999 | Urahashi | |
| 6,038,505 | A * | 3/2000 | Probst et al. | 701/65 |
| 6,085,151 | A * | 7/2000 | Farmer et al. | 701/301 |
| 6,092,006 | A | 7/2000 | Dominke et al. | |
| 6,138,178 | A * | 10/2000 | Watanabe | 710/8 |
| 6,154,658 | A * | 11/2000 | Caci | 455/466 |
| 6,154,688 | A * | 11/2000 | Dominke et al. | 701/1 |
| 6,161,071 | A * | 12/2000 | Shuman et al. | 701/48 |
| 6,175,789 | B1 * | 1/2001 | Beckert et al. | 701/33 |
| 6,188,315 | B1 * | 2/2001 | Herbert et al. | 340/438 |
| 6,188,316 | B1 * | 2/2001 | Matsuno et al. | 340/441 |
| 6,202,012 | B1 * | 3/2001 | Gile et al. | 701/48 |
| 6,259,985 | B1 * | 7/2001 | Sielagoski et al. | 701/96 |
| 6,269,289 | B1 * | 7/2001 | Toukura et al. | 701/1 |
| 6,292,741 | B1 * | 9/2001 | Bitzer et al. | 701/115 |
| 6,324,465 | B1 | 11/2001 | Teramura et al. | |
| 6,339,739 | B1 * | 1/2002 | Folke et al. | 701/70 |
| 6,353,785 | B1 * | 3/2002 | Shuman et al. | 701/48 |
| 6,360,152 | B1 * | 3/2002 | Ishibashi et al. | 701/48 |
| 6,374,173 | B1 * | 4/2002 | Ehlbeck | 701/93 |
| 6,405,132 | B1 * | 6/2002 | Breed et al. | 701/301 |
| 6,415,226 | B1 * | 7/2002 | Kozak | 701/210 |
| 6,470,252 | B2 * | 10/2002 | Tashiro et al. | 701/51 |
| 6,542,795 | B2 * | 4/2003 | Obradovich et al. | 701/1 |
| 6,553,297 | B2 * | 4/2003 | Tashiro et al. | 701/48 |
| 6,553,308 | B1 * | 4/2003 | Uhlmann et al. | 701/208 |
| 6,663,114 | B2 * | 12/2003 | Lamela et al. | 280/6.15 |
| 6,665,566 | B1 * | 12/2003 | Shibata et al. | 700/7 |
| 6,670,910 | B2 * | 12/2003 | Delcheccolo et al. | 342/70 |
| 6,727,844 | B1 * | 4/2004 | Zimmermann et al. | 342/70 |
| 6,865,458 | B1 * | 3/2005 | Kim | 701/36 |
| 6,968,266 | B2 * | 11/2005 | Ahmed-Zaid et al. | 701/96 |
| 6,982,635 | B2 * | 1/2006 | Obradovich | 340/439 |
| 7,133,661 | B2 * | 11/2006 | Hatae et al. | 455/404.1 |
| 7,188,016 | B2 * | 3/2007 | Flores et al. | 701/59 |
| 7,263,419 | B2 * | 8/2007 | Wheals et al. | 701/36 |
| 2001/0001319 | A1 * | 5/2001 | Beckert et al. | 701/36 |
| 2001/0012976 | A1 * | 8/2001 | Menig et al. | 701/1 |
| 2001/0016918 | A1 * | 8/2001 | Alexander et al. | 713/323 |
| 2001/0032275 | A1 * | 10/2001 | Watanabe et al. | 710/1 |
| 2001/0056318 | A1 * | 12/2001 | Tashiro et al. | 701/48 |
| 2002/0016659 | A1 * | 2/2002 | Tashiro et al. | 701/48 |
| 2002/0055811 | A1 * | 5/2002 | Obradovich | 701/23 |
| 2002/0115423 | A1 * | 8/2002 | Hatae et al. | 455/404 |
| 2002/0123833 | A1 * | 9/2002 | Sakurai et al. | 701/33 |
| 2002/0188392 | A1 * | 12/2002 | Breed et al. | 701/45 |
| 2002/0198632 | A1 * | 12/2002 | Breed et al. | 701/1 |
| 2003/0073406 | A1 * | 4/2003 | Benjamin et al. | 455/41 |
| 2003/0078699 | A1 | 4/2003 | Harms et al. | |
| 2003/0204298 | A1 * | 10/2003 | Ahmed-Zaid et al. | 701/96 |
| 2003/0225494 | A1 * | 12/2003 | Coelingh et al. | 701/48 |
| 2003/0225495 | A1 * | 12/2003 | Coelingh et al. | 701/48 |
| 2003/0225496 | A1 * | 12/2003 | Coelingh et al. | 701/48 |
| 2004/0041469 | A1 * | 3/2004 | Ishikawa et al. | 303/139 |
| 2004/0158377 | A1 * | 8/2004 | Matsumoto et al. | 701/48 |
| 2004/0215382 | A1 * | 10/2004 | Breed et al. | 701/45 |

FOREIGN PATENT DOCUMENTS

| | | |
|---|---|---|
| DE | 101 41 805 A1 | 5/2002 |
| JP | A-5-85228 | 4/1993 |
| JP | A 07-223488 | 8/1995 |
| JP | A-10-250417 | 9/1998 |
| JP | A 11-039033 | 2/1999 |
| JP | A 11-328593 | 11/1999 |
| JP | A 2001-158256 | 6/2001 |
| JP | A 2001-219760 | 8/2001 |
| JP | A 2002-010995 | 1/2002 |
| JP | A 2002-041142 | 2/2002 |

* cited by examiner

ROAD SURFACE
REACTION FORCE F (REQUEST BASED ON AT CONTROL SPACE)

(REQUEST BASED ON WHEEL STABILIZATION CONTROL SPACE)

VEHICLE CONTROL INFORMATION CONVEYANCE STRUCTURE, VEHICLE CONTROL DEVICE USING THE CONVEYANCE STRUCTURE, AND VEHICLE CONTROL SIMULATOR USING THE CONVEYANCE STRUCTURE

FIELD OF THE INVENTION

The present invention relates to a structure for constructing a control platform, that is, control system for vehicle control comprising a plurality of constituent elements for vehicle control.

BACKGROUND OF THE INVENTION

Conventionally, a structure for assembling a control system in which a plurality of constituent elements for vehicle control are hierarchically constructed is known. For example, JP-H5-85228 A discloses the following constitution in six hierarchical levels: the driver's wish is at the hierarchical level having the highest priority; and the hierarchies of the drive train and brake systems are at lower hierarchical levels. According to this prior art, commands flow only from a higher hierarchical level into a lower hierarchical level. In the above-mentioned prior art, a vehicle can be controlled with priority given to the driver's wish related to running stability over wish related to the forward drive of the vehicle. Thus, all the operation elements cannot be operated even at the hierarchical level at which the highest priority is given to the driver's wish. To cope with this problem, JP-H10-250417 A discloses a control method in which only one command transmitting unit is provided at a high hierarchical level, and a coordinating element for devices is disposed at the highest level. That is, a total vehicle coordinator is provided at the first hierarchical level, and a mechanical energy source and a vehicle movement device are provided at the second hierarchical level. Further, hierarchies are formed within the second hierarchical level. For example, within the mechanical energy source, a source coordinator is provided at the first hierarchical level, and individual elements, such as engine, clutch, and transmission, related to mechanical energy are disposed at the second hierarchical level. Within the vehicle movement device, a vehicle movement coordinator is disposed at the first hierarchical level, and individual elements, such as steering, drive train, brake, and chassis, related to vehicle movement are disposed at the second hierarchical level.

According to JP-H5-85228 A, for example, individual control devices for individual elements, such as steering, wheel drive, power train, brake, and engine, are distributed among hierarchies. Instructions are given only in the direction from a higher hierarchical level into a lower hierarchical level with a physical quantity which determines the interface between individual hierarchical levels. As mentioned above, in the hierarchical structure in the prior art, commands are transmitted only from a higher hierarchy into a lower hierarchy.

A control system having the chain of command/instruction only in the direction from higher level to lower level poses a problem. As an example, the following assumption will be made: a constituent element at a lower hierarchical level or a sensor whose signals are processed at the lower hierarchical level fails. Thus, the constituent elements at a higher hierarchical level than that of the failed constituent element recognize that a failed constituent element exists at the lower hierarchical level. At the same time, they must perform the operation of computing and excluding the functions and performance or influences of the constituent element which failed at the lower hierarchical level.

Control systems for vehicles are rich in product variety with respect to each car model or vehicle grade, and high-value added vehicles are large in number of sensors and economy cars are small in number of sensors. In this case, the constituent elements themselves at the higher hierarchical level or control at the higher hierarchical level must be modified depending on whether a sensor provided in the constituent element or the constituent element itself exists at the lower hierarchical level or not.

The prior art is considered only from the viewpoint of how individual control devices for individual elements, such as steering, power train, and engine, should be hierarchically structured. For example, suggestions as to how the idea (control structure) which is based on when a common control system is constructed in individual hierarchies should be developed are not present in the prior art. Or, suggestions as to how the idea (control structure) on which a control system for managing individual elements in a lump at a higher level is based should be developed are not present in the prior art.

JP-H10-250417 A includes a description that status information and conflict information are fed back and communicated between devices A and B. However, JP-H10-250417 A shows only such a constitution that requests from devices at the second hierarchical level are coordinated at the first hierarchical level as seen from the general viewpoint; and commands are issued to the second hierarchical level. In other words, with respect to hierarchical relation, a higher level is taken as a hierarchy for carrying out only coordination, and specific individual elements are provided at lower levels. This also applies to hierarchical structuring within the second hierarchical level, which is lower than the first hierarchical level. An example will be taken. Even the mechanical energy source, which is at the second hierarchical level as seen from the general viewpoint, adopts the following constitution: the mechanical energy source is provided therein with a source coordinator for carrying out only coordination at the higher level and individual elements, such as clutch, at the lower level.

As mentioned above, JP-H10-250417 A contains only the following ideas: the idea of hierarchical structuring based on what functions should be provided at the first hierarchical level and the second hierarchical level and how the control system should be disposed; and the idea of providing a portion for carrying out only coordination at the higher level and individual elements at the lower level in each hierarchy.

According to JP-H10-250417 A, the second hierarchical level as seen from the general viewpoint is divided into a mechanical energy source and a vehicle movement device. The mechanical energy source is provided with individual elements related to mechanical energy, and the vehicle movement device is provided with an individual element group related to vehicle movement. Further, within the vehicle movement device, a drive train and a brake as individual elements related to engine power are taken as one constituent element unit, and the constituent element unit has a torque distributor at a sublevel within the unit. Separately from the constituent elements of drive train and brake, the mechanical energy source is provided therein with an engine coordinator for controlling fuel injection and the like. The above-mentioned patent document includes the following description: operation elements, such as navigation system, are not included in the overall constitution of a vehicle or are positioned at a lower level as much as possible. As mentioned above, in this prior art, the largest framework of individual elements is divided into coordinating portion (first hierarchical level), mechanical portion (second hierarchical level), and movement control portion (second hierarchical level). As a result, control related to the same engine exists as it is divided into that for the mechanical energy source and that for the vehicle movement device at the second hierarchical level. When control for one function exists as it is divided into a plurality of systems, control for one component unit, for example, an engine cannot be completed within one device unit, for example, the vehicle movement device. When a component is changed from car model to car model, therefore, the restructuring of control, programming, and adaptation must be carried out with other devices also included. In case of this prior art, for example, both the vehicle movement device side and the mechanical energy source side must be coordinated when the engine is changed from car model to car model or from grade to grade.

The above-mentioned patent document considers the navigation system just as an operation element operated by an occupant. In the patent document, the following technical philosophy does not exist: map information, a global positioning system (GPS), and the like exist in the navigation system, and the navigation system can be aggressively utilized for vehicle control.

Consequently, the present invention is intended to provide a vehicle control information conveyance structure as a control platform in vehicles for solving any, any combination, or all of the above-mentioned problems, a vehicle control device using this conveyance structure, and a vehicle control simulator using this conveyance structure.

DESCRIPTION OF THE INVENTION

To solve the above-mentioned problems, one aspect of the invention is characterized in that it comprises: a cognition-system control platform having constituent elements for information system and/or surroundings monitoring system; an operation-system control platform having constituent elements for vehicle movement system; and a determination-system control platform which coordinates information from the cognition-system control platform and the operation-system control platform, and transmits requests to the cognition-system control platform and the operation-system control platform.

As mentioned above, the control device for a vehicle is divided into three, and the cognition-system, operation-system, and determination-system control platforms are constructed. Thereby, information on the surroundings of the vehicle from the navigation system or the like and information from a following distance sensor or the like provided in an adaptive cruise control device or the like can be aggressively utilized for the overall control of the vehicle.

Since the control device for a vehicle is divided into that for cognition-system, that for operation-system, and that for determination-system, control for one function is disposed in or connected to one control system, for example, the operation-system control platform. As a result, variation from car model to car model or from grade to grade can be easily coped with.

According to one aspect of the present invention the determination-system control platform is provided with a function of monitoring the condition of the driver; then, the condition of the driver is added to information from the cognition-system control platform and the operation-system control platform, and requests are transmitted to the cognition-system control platform and the operation-system control platform. As mentioned above, information on monitoring of the condition of the driver is gathered in the determination-system control platform within three different types of platforms. Thereby, the implementation determination about information inputted from the cognition-system platform and the operation-system platform can be varied and adapted to the condition of the driver.

Another aspect of the present invention is a conveyance structure for control information of a vehicle having a plurality of control functions. The conveyance structure is characterized in that it comprises: a first sensor which detects information on the outside of the vehicle and outputs it; a cognition-system control platform to which information based on the first sensor and/or information on the surroundings of the vehicle is inputted; a second sensor which detects the state of operation of an actuator operated by an occupant and outputs it and a third sensor comprising a sensor which detects the state of the vehicle body and outputs it; an operation-system control platform to which information based on the second sensor and/or the third sensor is inputted; and a determination-system control platform which makes execution determination on the plurality of control functions based on information from the cognition-system control platform and the operation-system control platform, and makes requests to the cognition-system control platform and the operation-system control platform in correspondence with the execution determination.

As mentioned above, the roles of the cognition-system platform and the operation-system platform are separated according to the input information of the sensors, in other words, the types of the sensors. Analysis and/or determination is carried out at the individual platforms based on information from the respective sensors, and then the result of the analysis/determination is transmitted to the determination-system control platform. Thus, the role of each platform is clarified in terms of the type of sensor, and information can be created at each platform according to car model variation and sensor failure. Therefore, the versatility is enhanced.

Another aspect of the present invention is a conveyance structure for control information of a vehicle having a plurality of control functions. The conveyance structure is characterized in that it comprises: a first sensor which detects information on the outside of the vehicle and outputs it; an information system constituent element having information on the surroundings of the vehicle; a cognition-system control platform having an allowable security space setting means for setting an allowable security space for the vehicle body, which space is the allowable range of movement of the vehicle body, based on information from the first sensor and/or information provided in the information system constituent element; a second sensor which detects the state of operation of an actuator operated by an occupant and outputs it and a third sensor comprising a sensor which detects the state of the vehicle body and outputs it; an operation-system control platform having an allowable movement space setting means for setting, as an allowable movement space of the vehicle body, the allowable range within which the vehicle body can move, based on information from the second sensor and/or the third sensor; and a determination-system control platform provided with a determination control space in which information on the allowable security space and the allowable movement space is received from the cognition-system control platform and the operation-system control platform, and sets control requests conveyed to the cognition-system control platform and the operation-system control platform.

As mentioned above, at the cognition-system control platform, a control space is established based on information held by the first sensor and/or the constituent elements in the surroundings monitoring system belonging to the cognition system. For the control space at this time, that is, the allowable security space, a controllable range is defined from the viewpoint of the range within which the vehicle body may move. As the first sensor, following distance sensor, GPS sensor, and the like can be named, and as information held in the constituent elements in the surroundings monitoring system, map information in the navigation system can be named. The allowable security space may be defined by time and vector. For example, the range of position within which the vehicle can move in safety and security a unit time later is defined by coordinates. Further, when the allowable security space is established, probabilistic setting may be introduced with safety taken into account.

At the operation-system control platform, a control space is established based on information from the second sensor belonging to the operation system and/or the third sensor belonging to the vehicle body movement system. The control space, that is, the allowable movement space defines a range within which the vehicle body can physically move when the basic maneuverability of the vehicle and/or the capabilities of a vehicle body behavior control device and the like provided in the vehicle are exercised to the full. As the second sensor, a sensor for detecting the amount of brake pedal operation, sensors for detecting the amount of accelerator pedal operation and steering angle, and the like can be named. As the third sensor, vehicle body longitudinal acceleration sensor, vehicle body lateral acceleration sensor, yaw rate sensor, tire inflation pressure sensor, and the like can be named. At this time, the allowable movement space may also be defined by time and vector. For example, the range of position within which the vehicle can physically move a unit time later is defined by coordinates. Further, when the allowable movement space is established, probabilistic setting may be introduced with the following taken into account: the probability that the vehicle can physically move, for example, how much load must be applied to the engine or the brake to arrive at a position, or to how much extent the performance of control devices for vehicle body behavior control and the like must be used to arrive at the position.

As mentioned above, the information system and the surroundings monitoring system of the vehicle are integrated into the cognition-system control platform, and the vehicle movement system, including the mechanical energy system, is integrated into the operation-system control platform. Information of the thus defined allowable security space and allowable movement space is put together in the determination-system platform. Control requests with the allowable security space and the allowable movement space taken into account are conveyed to the cognition-system control platform and the operation-system control platform. As this control request, for example, a command is outputted to drive the individual constituent elements belonging to the operation-system control platform so as to satisfy the range of position within which the vehicle can physically move a unit time later and in safety. Or, for example, information for supporting the driver may be provided to the driver so that driving satisfies the range of position within which the vehicle can physically move a unit time later and in safety. By ensuring that information is determined based on the allowable security space and the allowable movement space, support can be implemented with the safety of vehicle, occupants, pedestrians, and the like and vehicle performance taken into account. When the constitution according to claim 6 is adopted, the equal action and effect can be produced.

The second sensor may be constituted as follows: the state of at least one of driver's accelerator operation, brake operation, and steering operation is detected; the determination-system control platform receives the result of detection from the second sensor, and creates a command space which indicates the state of commands given by the driver; then the above-mentioned control requests are generated based on the allowable security space, allowable movement space, and command space. Thus, when the determination-system control platform forms the determination control space, a control space and a control command can be formed with the driver's skill, habit in driving, and the like directly taken into account, in addition to the safety of vehicle, occupants, pedestrians, and the like and vehicle performance.

The determination control space may be constituted as follows: the portion where the allowable security space, allowable movement space, and command space overlap is taken as the control request feasible range, and control requests are made to the operation-system control platform and/or the cognition-system control platform based on this control request feasible range. Thus, the following control can be implemented: the driver commands are met, and further the vehicle body is moved within a range in which the vehicle, occupants, pedestrians, and the like are safe, in other words, the vehicle body moves only within a range in which the vehicle, occupants, pedestrians, and the like are safe. The thus obtained control platform is applicable to future self-propelled vehicles.

The following constitution may be adopted: a plurality of control functions are distributed among hierarchies, and all the cognition-system control platform, operation-system control platform, and determination-system platform are provided in every hierarchy. Thus, with respect to the cognition-system and operation-system control platforms in each hierarchy, the respective control spaces are established in correspondence with sensors and constituent elements or information corresponding to the cognition-system and operation-system control platforms in the hierarchy. On the determination-system platform in each hierarchy, determination is carried out based on the allowable security space and the allowable movement space established using only information provided in the hierarchy. More specific description will be given. The control structure comprising the three systems, cognition system, operation system, and determination system, is based on the philosophy that control is carried out using only information provided. Even when individual constituent elements, individual control devices, and the like are hierarchically structured, the control structure which is less prone to be influenced by car model variation or failure can be constructed. "Hierarchy" or "hierarchical structure" can be interpreted as unified rules (regulations) for vehicle control which are laid down beforehand independently of car model or vehicle grade to the extent that control performance is not limited when vehicle control is constructed. A control platform comprising the operation-system, determination-system, and cognition-system control platforms can be said to be unified rules for control independent of each hierarchy.

A hierarchical control structure having the control platforms described up to this point may be constructed. In this case, as described in claim 16, for example, the control structure can be hierarchically constructed so that it comprises the following: a first hierarchy in which at least engine power is managed; a second hierarchy in which the state of driving force, or engine power transmitted to an axle through an automatic transmission; and a third hierarchy in which tire generative force delivered by each wheel is managed based at least on the above driving force for the axle. Thus, hierarchies in line with a dynamical model are obtained. The dynamical model takes as the origin the power of an engine that is the greatest force exerted on the vehicle and indicates how the engine power is transmitted. As a result, the positioning of each hierarchy can be clarified, and the versatility can be enhanced.

When the control level is hierarchically structured in correspondence with the objects controlled by the control function, the hierarchical structure is definite as rules for vehicle control, and the versatility can be enhanced. This versatility not only means applicability irrespective of car model or vehicle grade. Also, it includes the following meaning. Suppose that designers can be separated from one another, e.g., they can be divided into designers in charge of engine control, those in charge of brake control, and those in charge of steering control, when constructing the control structure of the entire vehicle. Even in this case, the fundamental matter about for what function they should work out satisfactory designs can be clarified.

The following constitution may be adopted: the determination-system control platform receives information for use in the determination control space from the operation-system control platform in the immediately higher hierarchy and/or the immediately lower hierarchy. Thus, information is conveyed between hierarchies, and information created in each hierarchy can be effectively utilized.

DESCRIPTION OF THE BEST EMBODIMENT OF THE INVENTION

Recently, the number of control devices installed in vehicles has been increased with the enhancement of vehicle performance. These control devices include not only engine control device, automatic transmission device, electric power steering device, and the like which relate to the basic performance of the vehicle. The control devices also include an antiskid control device, a traction control device, and a vehicle body behavior control device which relate to vehicle body braking as well as an adaptive cruise control system and the like which support the driver's operation. Further, they include a navigation system which notifies occupants of information of the present position and route as additional information for vehicle running, traffic congestion information reporting system, and the like.

Information held in a wide variety of recent individual control devices themselves, for example, map information held in a navigation system and information from sensors which become indispensable as the result of installation of individual control devices, must be meaningfully used for the entire vehicle. And/or, a control structure wherein, even if individual control devices added are changed from car model to car model or from grade to grade, portions requiring the reconstruction of a control system for the entire vehicle are minimized must be constructed.

Figure 1:
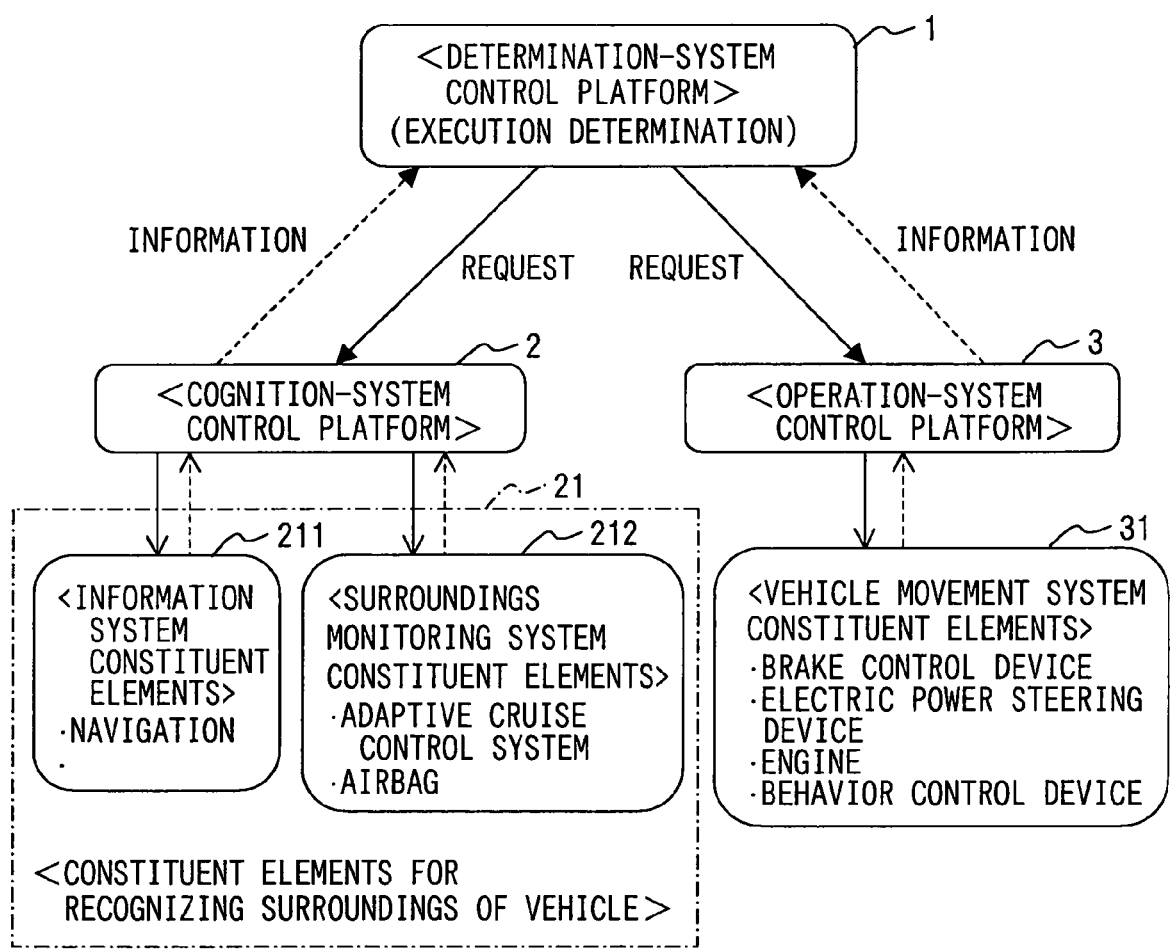
FIG. 1 is a block diagram illustrating a first embodiment.

FIG. 1 is a system configuration diagram illustrating a first embodiment of the present invention.

In the first embodiment, individual control devices are classified into information system constituent elements 211, surroundings monitoring system constituent elements 212, and vehicle movement system constituent elements 31. The information system constituent elements 211 and the surroundings monitoring system constituent elements 212 are classified into one group, and they are considered as constituent elements 21 for recognizing the surroundings of the vehicle. The individual constituent elements which are control devices provided in the vehicle are roughly classified into two categories: constituent elements 21 for recognizing the surroundings of the vehicle and vehicle movement system constituent elements 31.

Under the category of information system constituent elements 211, a navigation system, a traffic congestion information reporting system, and the like are classified. Under the category of surroundings monitoring system constituent elements 212, an adaptive cruise control system, an airbag system, a lane keep system, and the like are classified.

The information system constituent elements 211 and the surroundings monitoring system constituent elements 212 are provided with sensors and/or information through which it can be recognized in what geographical or surrounding circumstances the vehicle is now running. For example, the navigation system is provided with map information and with a GPS device for detecting the present vehicle position as well. The traffic congestion information reporting system is provided with a sensor for detecting route information, such as traffic congestion information, transmitted from transmitters on the road. The adaptive cruise control system and/or the lane keep system is provided with a following distance sensor, such as millimeter wave radar and laser radar, and the airbag system is provided with a sensor, such as mechanical longitudinal acceleration sensor and lateral acceleration sensor, for detecting vehicle collision.

The individual control devices, such as the above-mentioned navigation system and adaptive cruise control system, classified under the category of information system constituent elements 211 and/or surroundings monitoring system constituent elements 212 are systematized so that they communicate information with a cognition-system control platform 2. That is, the cognition-system control platform 2 corresponds to the individual control devices belonging to the information system constituent elements 211 and the surroundings monitoring system constituent elements 212.

When a vehicle is not provided with either the navigation system or the traffic congestion information reporting system, the information system constituent elements 211 do not exist. Thus, the cognition-system control platform 2 cannot receive information belonging to the information system constituent elements 211, that is, map information, information on the present vehicle position, or the like. When a vehicle is not provided with information system constituent elements 211 at all or surroundings monitoring system constituent elements 212, such as adaptive cruise control system and airbag system, at all, information from the constituent elements 21 for recognizing the surroundings of the vehicle to the cognition-system control platform 2 does not exist. Therefore, in this embodiment, at least one control device belonging to the information system constituent elements 211 or the surroundings monitoring system constituent elements 212 is required.

Under the category of vehicle movement system constituent elements 31, such individual control devices as engine control device, electric power steering device, antiskid control device, traction control device, vehicle body behavior control device, and tire inflation pressure monitor are classified.

The vehicle movement system constituent elements 31 are provided with sensors which indicate in what state of movement the vehicle is presently. For example, when a vehicle body behavior control device is provided, sensors for detecting the longitudinal acceleration, lateral acceleration, yaw rate, and the like of the vehicle body are provided. Also, a sensor for detecting brake oil pressure used for brake control is provided. However, there are cases where the vehicle body movement system constituent elements 31 are provided only with control devices and individual actuators which do not carry out control using the longitudinal acceleration, lateral acceleration, yaw rate, brake oil pressure, or the like. In these cases, naturally, these sensors are not provided, either. Individual actuators refer to a brake pedal, accelerator pedal, and the like operated by an occupant, and the electric power steering device may be classified under the category of individual actuator.

These vehicle movement system constituent elements 31 are systematized so that they communicate information with an operation-system control platform 3. That is, the operation-system control platform 3 corresponds to the individual control devices belonging to the vehicle movement system constituent elements 31.

Information inputted to the cognition-system control platform 2 from the information system constituent elements 211 and/or the surroundings monitoring system constituent elements 212 is transmitted to a determination-system control platform 1. Information inputted to the operation-system control platform 3 from the vehicle movement system constituent elements 31 is also transmitted to the determination-system control platform 1. On the determination-system control platform 1, the pieces of information inputted from both the control platforms 2 and 3 are coordinated, and execution determination is carried out with respect to each constituent element belonging to the cognition-system control platform 2 or the operation-system control platform 3. Then, requests for control, sensing, and/or the like are transmitted to the cognition-system control platform 2 and the operation-system control platform 3. In the drawings illustrating this embodiment and the following embodiments, arrows which indicate the transmission/reception of requests are depicted by solid lines, and arrows which indicate the transmission/reception of information are depicted by broken lines.

When receiving these requests, the cognition-system control platform 2 and the operation-system control platform 3 output execution permission and/or execution requests to the respective constituent elements in accordance with the requests.

In the above-mentioned control structure, control devices related to the movement of the vehicle are classified under the category of vehicle movement system constituent elements 31. Other individual devices are classified under the category of information system constituent elements 211 or surroundings monitoring system constituent elements 212, as devices belonging to the cognition system. Therefore, for example, a control device or control related to engine control is prevented from being disposed astride the operation-system control platform and another control platform, that is, the determination-system control platform or the cognition-system control platform. As a result, the following advantages are produced: even if individual control devices are changed from car model to car model or from grade to grade, only those belonging to the operation-system control platform 3 are changed; thus, redesigning or reconstruction of the cognition-system control platform or the determination-system control platform is unnecessary. In other words, even if constituent elements included in the vehicle movement system constituent elements 31 and the constituent elements 21 for recognizing the surroundings of the vehicle differ from grade to grade or the like, modification to the determination-system control platform 1 itself is not required at all.

The sensor of-an individual control device belonging to the cognition-system control platform 2 or the operation-system control platform 3 can fail, or such a sensor may not be installed. In these cases, failure information or information or state that the sensor is not installed can be coordinated on the cognition-system control platform 2 or the operation-system control platform 3 to which the sensor should belong. That is, information on control executable by only this coordinated information, in other words, information presently provided is conveyed from the cognition-system control platform 2 or the operation-system control platform 3 to the determination-system control platform 1. Therefore, the determination-system control platform 1 can carry out execution determination on executable control regardless of any failure in individual control devices or sensors.

In the above-mentioned control structure, individual constituent elements (control devices) can be managed in a lump at a higher level. More specific description will be given. Constituent elements are made to belong to the cognition-system control platform 2 or the operation-system control platform 3. Thereby, the constituent elements can be managed in a lump on the cognition-system control platform 2, operation-system control platform 3, and determination-system control platform 1 which are control systems at higher levels than that of the constituent elements.

Further, the navigation system and the like that are conventionally irrelevant to the movement of the vehicle are made to belong to the cognition-system control platform 2. Thereby, information held by the navigation system and the like can be effectively utilized for the control of the entire vehicle.

Figure 2:
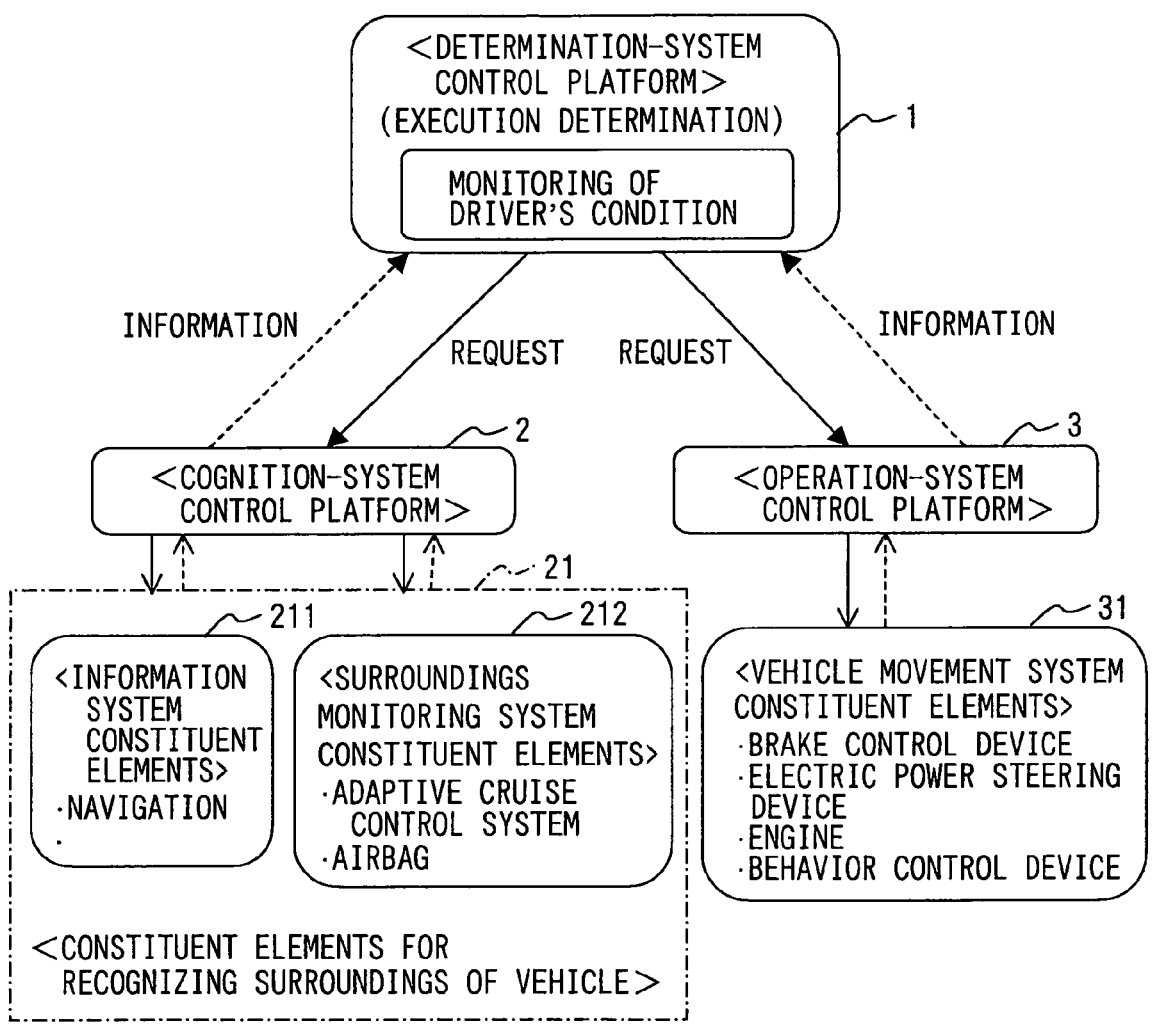
FIG. 2 is a block diagram illustrating a second embodiment.

Next, a second embodiment will be described based on FIG. 2. The description of the same items as in the first embodiment will be omitted.

In the second embodiment, the determination-system control platform 1 is provided with a function of monitoring the condition of the driver. Monitoring the condition of the driver refers to monitoring the driver's physiological condition, habit in driving, and the like. For example, drive dozing is detected from the degree of fluctuation in a vehicle body speed and the strength of grip on the steering wheel. Habits in turning the steering wheel, depressing the accelerator, and applying the brake are determined by a steering angle sensor, acceleration stroke sensor, and brake pedal stroke sensor. Information on the thus determined condition of the driver is taken into account when the pieces of information from the cognition-system control platform 2 and the operation-system control platform 3 are coordinated on the determination-system control platform 1. Information obtained by monitoring the driver, as mentioned above, may be taken into account when execution determination is carried out by the individual control devices belonging to the cognition-system and operation-system control platforms 2 and 3. Further, the information may be communicated to the driver by using these individual control devices or a separate reporting device.

Figure 3:
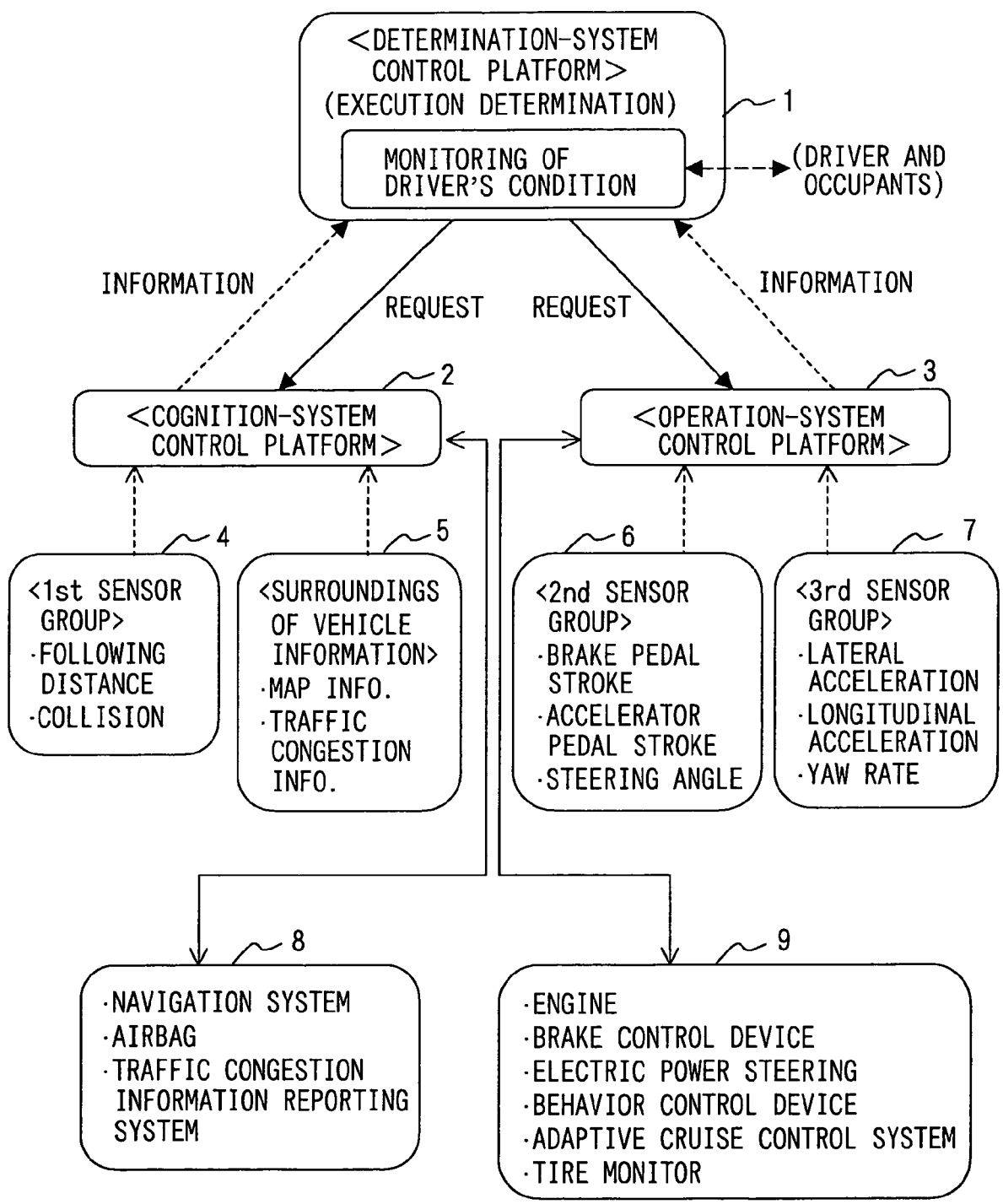
FIG. 3 is a block diagram illustrating a third embodiment.

Next, a third embodiment will be described based on FIG. 3. The description which overlaps that of the above-mentioned embodiments will be omitted.

In the above-mentioned embodiments, the individual control devices which are information system constituent elements 211, surroundings monitoring system constituent elements 212, or vehicle movement system constituent elements 31 belong to the cognition-system control platform 2 and the operation-system control platform 3. In the third embodiment, sensors used in individual control devices are considered to be independent of the individual control devices, and these sensors are made to belong to the cognition-system control platform 2 and the operation-system control platform 3. The individual control devices 8 and 9 belong to a cognition-system control platform or an operation-system control platform which is the same as or different from the cognition-system control platform or the operation-system control platform to which the sensors used by these devices belong. For example, while an adaptive cruise control system as an individual control device belongs to the operation-system control platform 3, a following distance-sensor used by the adaptive cruise control system may belong to the cognition-system control platform 2.

In a first sensor group 4, a following distance sensor and a collision sensor are placed, and these sensors are systematized so that they transmit information to the cognition-system control platform 2. Under the category of surroundings of vehicle information 5, map information provided in the navigation system is placed, and it is systematized so that the information is transmitted to the cognition-system control platform 2 or the information is pulled up by the cognition-system platform 2. In a second sensor group 6 for detecting the amounts of operation of the steering wheel and actuators, such as accelerator pedal and brake pedal, operated by the driver, a brake pedal stroke sensor, an accelerator pedal stroke sensor, and a steering angle sensor are placed. They are systematized so that they transmit information to the operation-system control platform 3. In a third sensor group 7, a lateral acceleration sensor, a longitudinal acceleration sensor, and a yaw rate sensor are placed, and they are similarly systematized so that they transmit information to the operation-system control platform 3. The second sensor group 6 and the third sensor group 7 may be constituted as one sensor group.

In a case that the cognition-system or operation-system control platform to which individual control devices belong are different from the cognition-system or operation-system control platform to which the sensors required by the individual control devices belong, the following takes place: for example, sensor information from the following distance sensor or the like is transmitted to the cognition-system control platform 2, and then transmitted from the cognition-system control platform 2 to the determination-system control platform 1. Thereafter, the sensor information is transmitted from the determination-system control platform 1 to the operation-system control platform 3, and then transmitted from the operation-system control platform 3 to individual control devices, such as adaptive cruise control system.

Alternatively, sensor information inherently required by individual control devices, for example, following distance information for the adaptive cruise control system may be transmitted from the sensor directly to the individual control device (adaptive cruise control system in this case). Further, when following distance information is used for an individual control device, such as brake control device, which does not have the sensor inherently in this case, the information may be transmitted as follows: it is transmitted to the individual control device by way of the cognition-system control platform 2, determination-system control platform, and operation-system control platform 3 in this order.

When the control information conveyance structure is constituted as mentioned above, the same action and effect as in the first embodiment can be produced.

In the third embodiment, the individual control devices and the sensors are separated from each other when they are considered. Thereby, the versatility can be further enhanced with respect to variation in the individual control devices themselves, variation in the presence/absence of sensors, failure in the individual control devices, and sensor failure.

Figure 4:
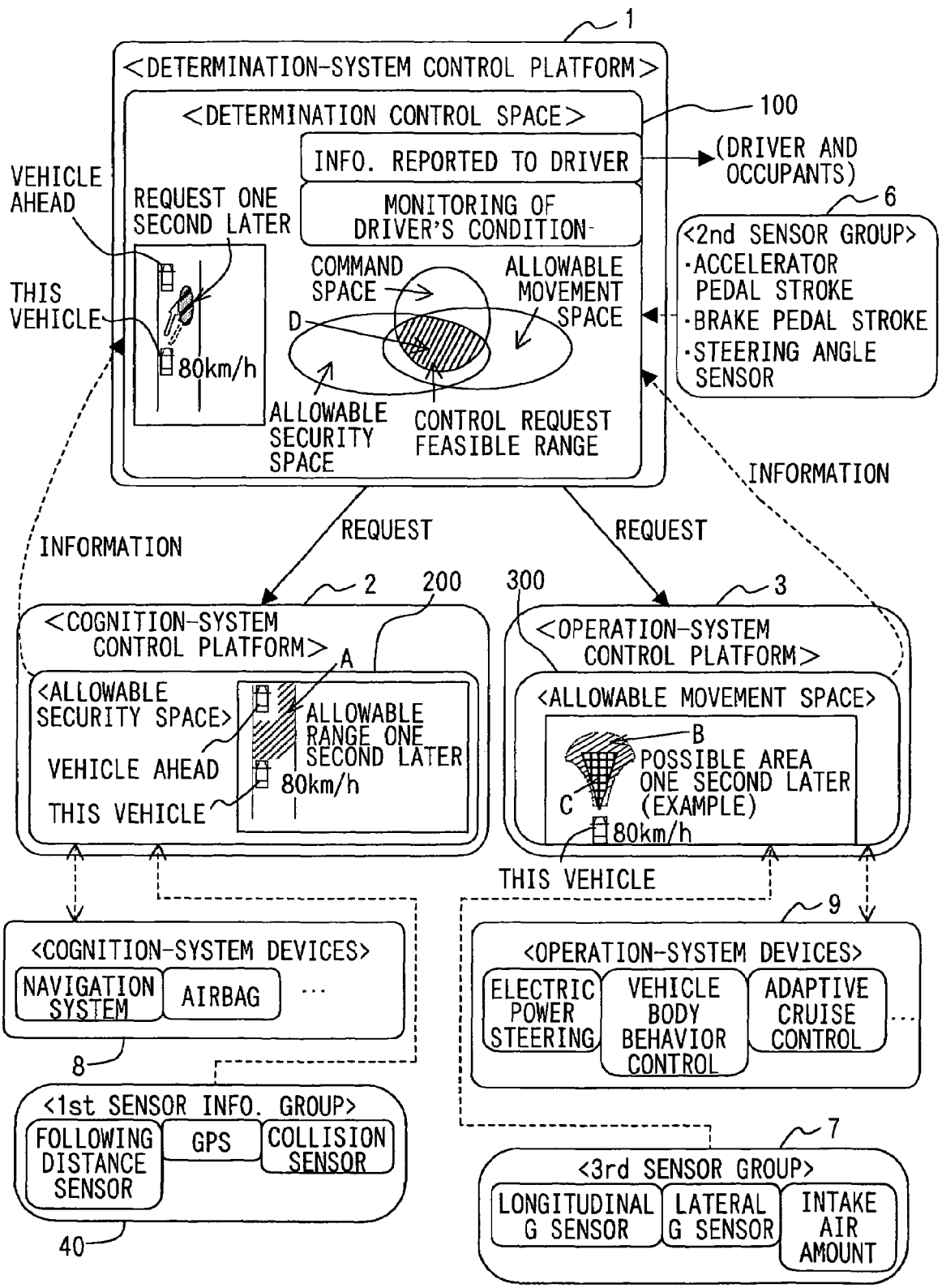
FIG. 4 is a block diagram illustrating a fourth embodiment.
Figure 5:
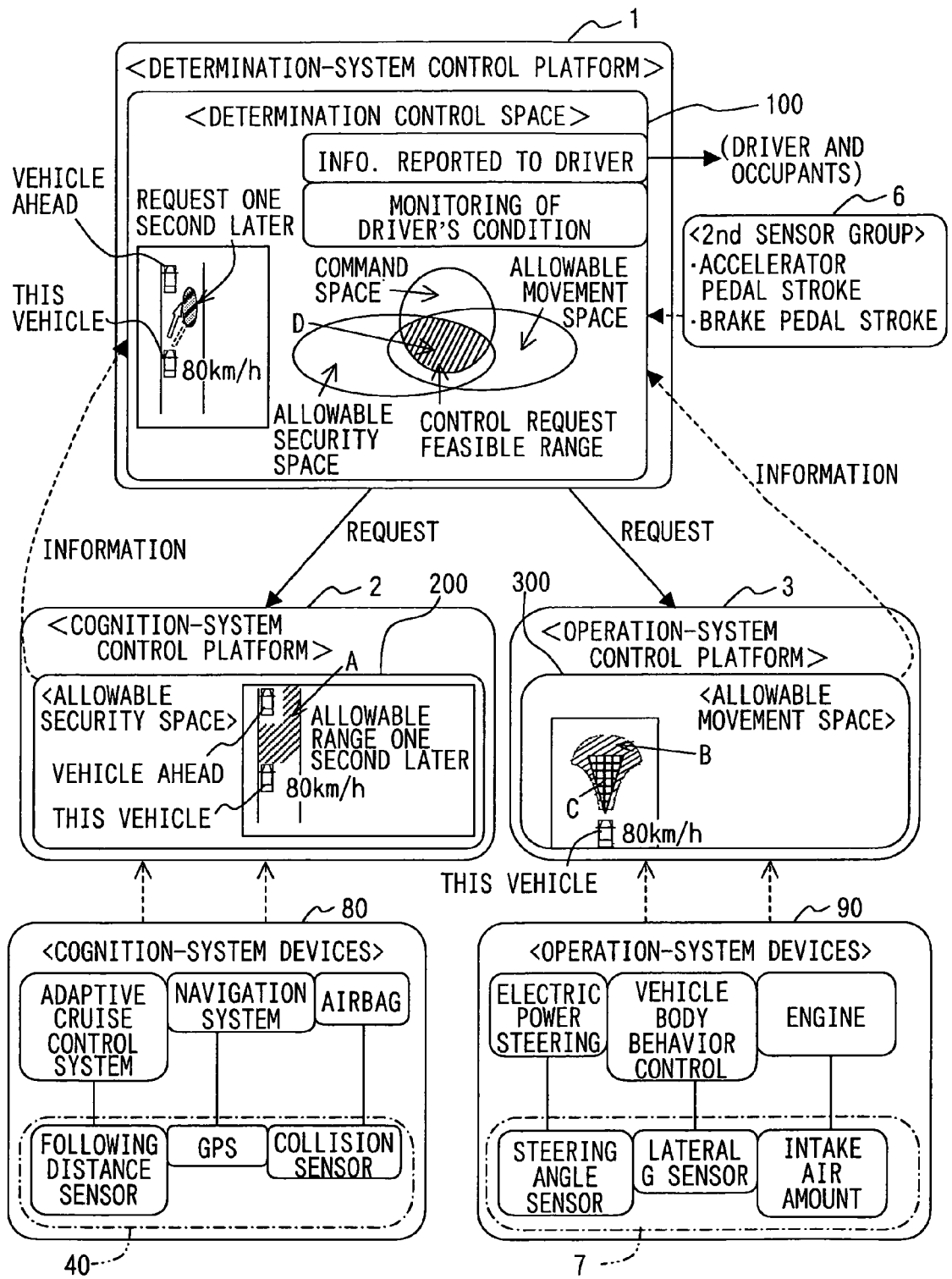
FIG. 5 is a block diagram illustrating a modification to the fourth embodiment.

Next, a fourth embodiment and its modification will be described based on FIG. 4 and FIG. 5. The same items as in the first to third embodiments will be marked with item names or numerals, and their description will be omitted. The first sensor information group 40 in FIGS. 4 and 5 is a combination of the first sensor group 4 and the surroundings of vehicle information 5 in the above-mentioned embodiments.

In the fourth embodiment, a control space is defined on the cognition-system control platform 2, operation-system control platform 3, and determination-system control platform 1, respectively.

On the cognition-system control platform 2, an allowable security space 200 which defines a spatial range in which this vehicle can move in safety and security is defined as a control space. As this allowable security space 200, for example, range A (indicated by hatching in the figure) within which this vehicle may move one second later is defined by a vector. At this time, the probability that this vehicle may move may be evaluated according to the degree of risk. More specific description will be given. For example, when a telegraph pole or another vehicle exists ahead of this vehicle, the range within which this vehicle may move is established according to the distance to the telegraph pole or vehicle and the vehicle body speed at the present moment. When a pedestrian exists ahead of this vehicle on the left, the range within which this vehicle may move is defined according to the distance to the pedestrian and the vehicle body speed at the present moment. However, when manward safety is involved, the probability may be set so that the range of high probability (i.e. of high possibility that this vehicle may move) will be narrowed as compared with cases where a solid substance, such as telegraph pole, exists.

On the operation-system control platform, an allowable movement space 300 which defines a spatial range in which this vehicle can physically move using the individual control devices of the individual operation-system devices 9 provided in this vehicle is defined as a control space. As this allowable movement space 300, for example, range B (indicated by hatching in the figure) within which this vehicle can move one second later is defined by a vector. That is, range B in which this vehicle can physically move when the functions of the engine, the brake, and the control devices, such as antiskid control device and vehicle body behavior control device, for coordinating the movement of the vehicle body provided in the vehicle are exercised to the full is defined. For range B in which this vehicle can physically move, a probability may be set according to the degree of margin. Range C in which this vehicle can move only through operation by the occupant may be separately established depending on the specifications of the vehicle or the brake, engine, and steering originally provided in the vehicle. In this case, range C (indicated by lattice in the figure) is included in range B, and in range B outside range C, the setting of probability is made lower than that in range C.

The pieces of information of the thus established allowable security space 2 and allowable movement space 3 are respectively transmitted from the cognition-system control platform 2 and the operation-system control platform 3 to the determination-system control platform 1. On the determination-system control platform 1, execution determination is made in line with the allowable security space 200, the allowable movement space 300, and a command space based on a driver command determined according to information from the second sensor group 6 and the like. As the control space in which this execution determination is made, a determination control space 100 is specified. With respect to this execution determination, the position to which the driver desires to move the vehicle body one second later is defined by a vector with the range in which the vehicle can move in safety taken into account. An example will be taken. When the driver command is beyond the allowable security space 200, the command is processed in the determination control space 100 into a control request that is included in the allowable security space 200 without fail, and the control request is transmitted to the operation-system control platform 3. When the driver command is beyond the allowable movement space 300, the command is processed in the determination control space 100 into a control request that is included in the allowable movement space 300 without fail, and the control request is transmitted to the operation-system control platform 3. When the driver command is out of the range where rang A defined in the allowable security space 200 and range B (or C) defined in the allowable movement space 300 overlap each other, the following measure is taken: a control request is included in the overlapping range D (indicated by hatching in the figure) without fail, and the control request is transmitted to the operation-system control platform 3.

Or, the following constitution may be adopted: a request is transmitted to the operation-system control platform 3 based on the range where range A determined in the allowable security space 200, range B or C determined in the allowable movement space 300, and a command range (equivalent to command space) based on the driver command overlap one another.

When the driver command is out of range A determined in the allowable security space 200 and/or range B or C determined in the allowable movement space 300, the driver may be informed of this. In this case, the determination-system control platform 1 may directly request devices in the instrument panel (e.g. meters and indicators) to inform the driver. Or, the following constitution may be adopted: the determination-system control platform 1 makes a request to inform to the cognition-system control platform 2, and the driver is informed using any of cognition-system devices which are the constituent elements belonging to the cognition-system control platform 2. Alternatively, the following constitution may be adopted: the determination-system control platform 1 makes a request to inform to the operation-system control platform 3, and the driver is informed using any of operation-system devices 9 which are the constituent elements belonging to the operation-system control platform 3.

FIG. 5 illustrates a modification to the fourth embodiment. This modification to the fourth embodiment is different from the constitution illustrated in FIG. 4 in that: the first sensor group 40 in FIG. 4 is classified and included in cognition-system devices 80 as the information system constituent elements and the surroundings monitoring system constituent elements in the above-mentioned embodiments; the third sensor group 7 in FIG. 4 is classified and included in operation-system devices 90 as the vehicle movement system constituent elements in the above-mentioned embodiments.

In the fourth embodiment and its modification illustrated in FIG. 4 and FIG. 5, the same action and effect as in the above-mentioned embodiments can be produced.

The above-mentioned embodiments are implemented by modeling in one hierarchy what control structure is provided with respect to a plurality of control devices that exit in a vehicle. As in the fifth embodiment described based on FIG. 6 including FIG. 6a and FIG. 6b, the present invention is also applicable to a control structure having a plurality of control hierarchies.

Figure 6A:
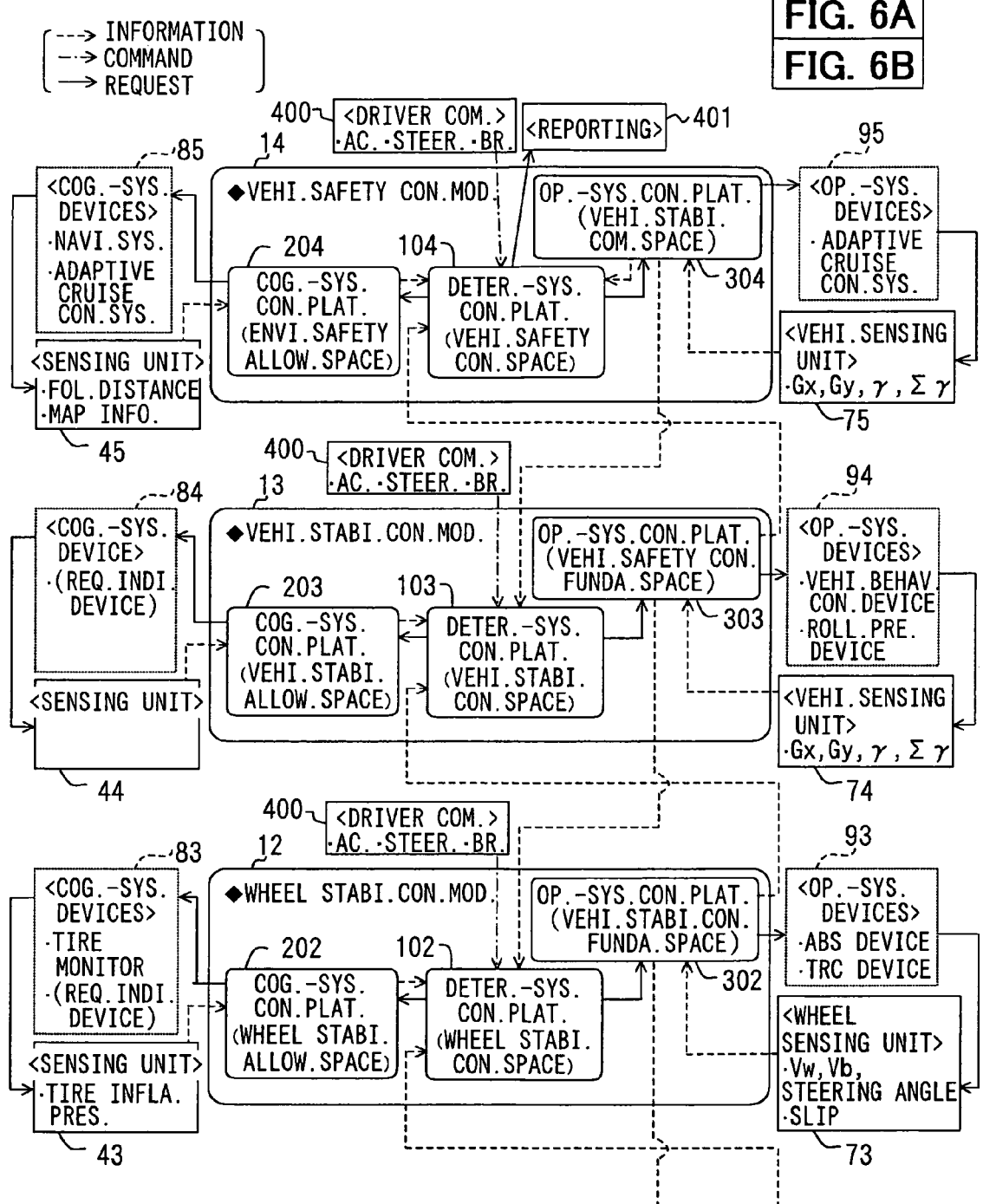
FIG. 6 including FIG. 6A
FIG. 6B is a block diagram illustrating a fifth embodiment.
Figure 6B:
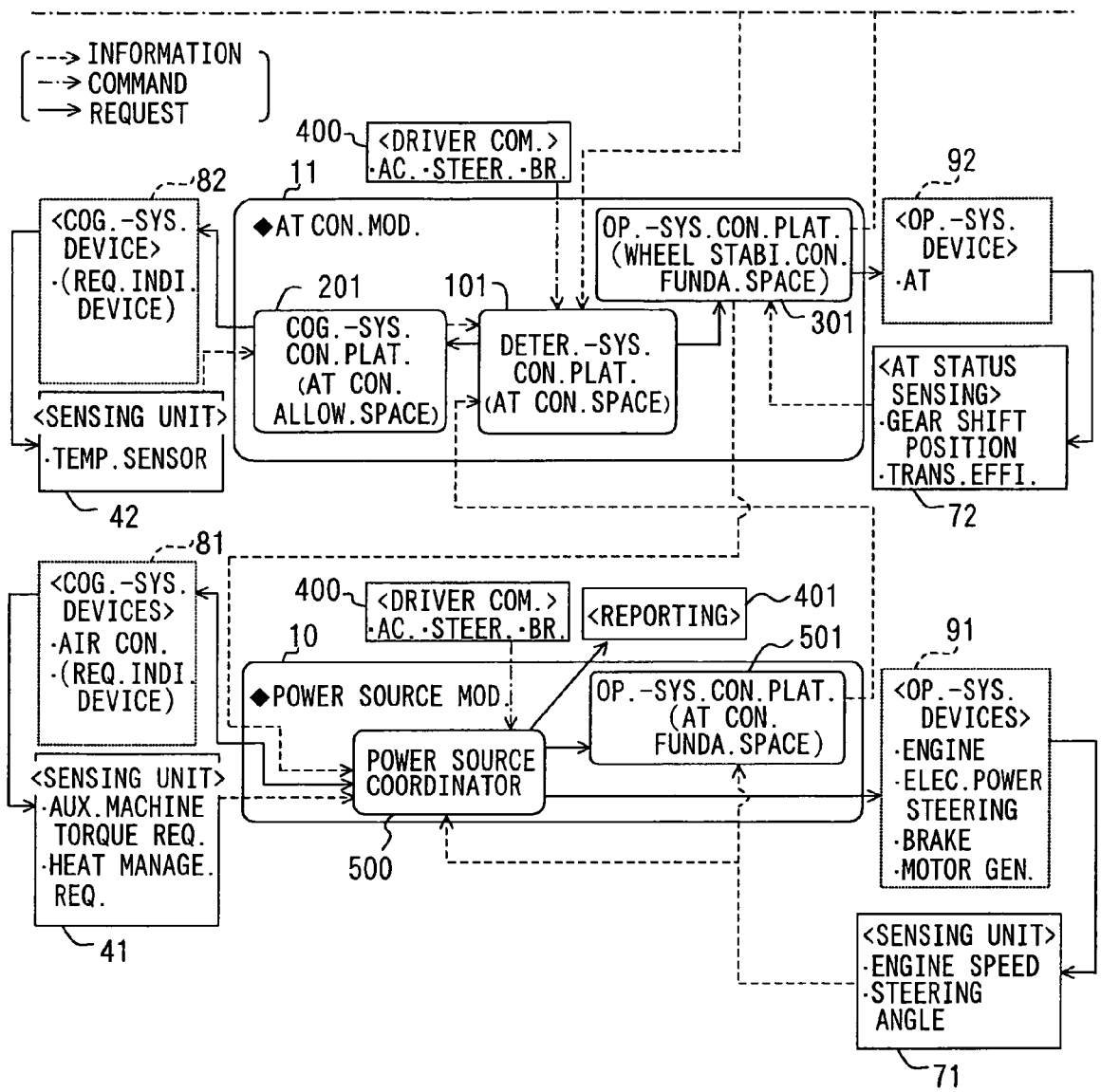

In the example in FIG. 6 including FIG. 6a and FIG. 6b, vehicle control and individual control devices and sensors provided in a vehicle are distributed among a first hierarchy 10 to a fifth hierarchy 14 when they are disposed. Basically, each of the first to fifth hierarchies is provided with the cognition-system control platform, operation-system control platform, and determination-system control platform described with respect to the above-mentioned embodiments. However, the first hierarchy 10 described later is a hierarchy which relates to the most basic functions of the vehicle, and is not constituted so that it is provided with all of the cognition-system control platform, operation-system control platform, and determination-system control platform.

First, how each hierarchy is positioned in vehicle control will be described.

The first hierarchy 10 is the minimum hierarchy required for controlling the most fundamental functions, running, turning, and stopping, of vehicles. That is, the first hierarchy 10 is constructed as a power source model in which action force exerted on the vehicle is managed. A typical action force is engine power, and as other action forces, action force which is exerted so as to turn the vehicle by turning of the steering wheel and braking force can be named. To constitute the first hierarchy as the minimum hierarchy required in the present vehicles, the engine, electric power steering, and brake must be electronically controlled. That is, the engine electronically controls the amount of fuel injection and the amount of intake air, and the driver's force for turning the steering wheel is electrically assisted by the electric power steering. With respect to the brake as well, a device has been becoming standard equipment which electrically controls braking force by a publicly known brake by wire or the like not only during limited periods of antiskid control and the like but also in normal braking. However, when normal braking is provided simply by a hydraulic brake and only devices having no room for electronic control are installed, the brake must be removed from the first hierarchy 10. This is the same with the power steering. When a power steering device is controlled simply hydraulically, not electrically, the power steering device must be removed from the first hierarchy 10.

The second hierarchy 11 is constructed as an AT control model in which an automatic transmission (hereafter, abbreviated as "AT") for converting power transmitted from engine to axle in multiple steps is managed in accordance with the power of the vehicle, that is, engine power, brake force, and/or turning force by steering. This is a model in which, for example, engine power controlled in the first hierarchy 10 is converted into torque exerted on the axle.

The third hierarchy 12 is constructed as a wheel stabilization control model in which the tire generative force at each wheel of the vehicle is managed. That is, the torque of axle, which is the result of conversion in the second hierarchy 11, is transmitted to each wheel. Each wheel obtains reaction force from the road surface, and produces action force between the tires and the road surface and exerts it on the vehicle. Tire generative force is synonymous with this action force produced between the tires and the road surface. The third hierarchy 12 can be said to be a multiwheel model versus a uniaxial model based on a single axis of axle. In the multiwheel model, consideration is given to action force from the road surface to the vehicle body at the ground contact point of each wheel. In other words, this is a mode in which the road surface reaction force at the ground contact points of two or four driving wheels is managed, and thereby action force exerted on the vehicle body is managed.

The fourth hierarchy 13 is constructed as a vehicle stabilization control model in which what movement the vehicle body makes is managed using road surface reaction force received by each wheel as input. An example will be taken. When the vehicle body rolls or sways, the comfort of the occupants is degraded. In addition, the power of engine driving force can be considered to be used in unnecessary movement, such as rolling vibration. Consequently, the model may be constructed from the viewpoint of that, when the vehicle body is stabilized, the fuel economy can also be enhanced.

In the fifth hierarchy 14, a vehicle safety control model is constructed from the viewpoint of safety management wherein the safety of the occupants and/or the surroundings is ensured whatever movement the vehicle makes. For the details of the fifth hierarchy 14, those in the embodiments described based on FIG. 4 and FIG. 5 can be adopted.

The hierarchies of the thus constructed control structure are enhanced in functions as it goes from the first hierarchy 10 to the fifth hierarchy 14. At the same time, the hierarchies are constructed from a lower level to a higher level relative to the engine based on how the power of the engine is transmitted to the vehicle body. More specific description will be given. The hierarchies are constructed in the order of engine to AT to wheels (through axle and vehicle body) to vehicle body, and the hierarchy at the highest level is constructed as a hierarchy for stabilizing the movement of the vehicle body and further enhancing the safety of the vehicle.

Next, description will be given to the control platform constituted in each hierarchy and sensing units comprising cognition-system devices operation-system devices, sensors, and the like.

The control platform in the first hierarchy 10 comprises a, power source coordinator 500 and an operation-system control platform 501. The first hierarchy 10 is related to the most basic performance of the vehicle, and a constitution corresponding to the cognition-system control platform does not exist in this hierarchy.

The cognition-system devices 81 in the first hierarchy 10 include air conditioner and the like. The sensing unit 41 belonging to the cognition-system devices 81 in the first hierarchy 10 transmits auxiliary machine torque desired values and heat management desired values as information to the power source coordinator 500 based on the operating state of the air conditioner and the like. The cognition-system devices, such as air conditioner, can request of the sensing unit 41 what information should be transmitted to the power source coordinator 500 based on requests from the power source coordinator 500.

The operation-system devices 91 in the first hierarchy 10 include engine control device, electric power steering device, motor generator, and brake control device for delivering the basic performance of the vehicle. When the power steering device is not an electric power steering device but is a hydraulic power steering device and is uncontrollable, it is not included in the operation-system devices 91. This is the same with the brake control device. Brake by wire devices are designed so that the occupant's intention to apply the brake, conveyed through pedal depression, is converted into electrical signals and braking force is ensured by a motor or a motor pump. Normal braking devices are designed so that the occupant's pedal effort is simply converted into oil pressure to apply the brake. When the basic brake is not a brake by wire device but a normal brake device and is uncontrollable, it is not included in the operation-system devices 91. The individual control devices belonging to the operation-system devices 91 are respectively driven based on requests from the power source coordinator 500.

The sensing unit 71 belonging to the operation-system devices 91 in the first hierarchy 10 includes an engine speed sensor and steering angle sensor. The results of detection by these sensors are transmitted from time to time to the power source coordinator 500 and the operation-system control platform 501. The results of detection may be transmitted to the power source coordinator 500 and/or the operation-system control platform 501 as follows: when the power source coordinator 500 requests an operation-system device 91 to transmit information, the operation-system device 91 issues a request to the sensing unit 71 in accordance with the request; then, the sensing unit transmits information in accordance with the request.

Based on information from the sensing units 41 and 71 and driver commands from a driver command 400, the power source coordinator 500 generates request signals which indicate how the individual control devices belonging to the operation-system devices 91 should be driven. When generating a request signal, the power source coordinator 500 makes adjustment with consideration given to the following based on a driver command: the driving state of a plurality of individual control devices, an auxiliary machine torque request, a heat management request, and a wheel stabilization control fundamental space considered on the operation-system control platform 301 in the second hierarchy 11. Further, the power source coordinator 500 transmits a report request to a reporting device 401, which reports the failed state and the like of individual control devices, based on the result of the above-mentioned adjustment and the results of detection by the sensing units 41 and 71.

The driver command 400 generates command signals based on detection signals from sensors which detect values corresponding to the amount of accelerator pedal depression, steering angle, and the amount of brake pedal depression, respectively, and transmits the signals to the power source coordinator 500. The command signals are based on the driver's intention to accelerate, turn, and apply the brake. The driver command 400 is shown only in the first hierarchy 10 and the fifth hierarchy 14 in the figure. However, the present invention is not limited to this constitution, and command signals may be transmitted to the determination-system control platform 500 and 101 to 104 in every hierarchy.

The operation-system control platform 501 in the first hierarchy generates an AT control fundamental space based on the result of adjustment by the power source coordinator 500 and the result of detection of engine speed and the like from the sensing unit 71. This AT control fundamental space is an allowable movement space in which, for example, which a gear shift position range can be permitted with consideration given to the present driving state (output) of the engine, the auxiliary machine torque request, and the like.

Next, description will be given to the constitution of each platform and the like in the second hierarchy 11.

In this embodiment, the cognition-system devices 82 do not exist in the second hierarchy 11. However, an ambient temperature sensor exists as a sensor belonging to the sensing unit 42 corresponding to the cognition-system devices 82 in the second hierarchy 11. The result of detection by the ambient temperature sensor is transmitted from time to time to the cognition-system control platform 201 in the second hierarchy 11. When the result of detection is transmitted based on requests from the cognition-system control platform 201, an additional device of some kind is required as a cognition-system device 82. In this case, as the cognition-system device 82 in the second hierarchy 11, a request indicating device may be installed independently of individual control devices, for transmitting and receiving and/or processing sensing requests.

As the operation-system device 92 in the second hierarchy 11, AT exists. This operation-system device 92 is driven in accordance with drive requests from the operation-system control platform 301 in the second hierarchy 11. When a sensing request comes from the operation-system control platform 301, the request is transmitted to an AT status sensing unit 72.

The AT status sensing unit 72 is a sensing unit corresponding to the operation-system device 92, and includes a sensor for detecting the gear shift position and sensors or computing units for detecting the state of transmission efficiency of gear and torque converter. The sensor and the like belonging to the AT status sensing unit 72 transmits from time to time the results of detection to the operation-system control platform in the second hierarchy 11 and/or transmits the results of detection in accordance with requests from the operation-system device 92.

The cognition-system control platform 201 in the second hierarchy 11 receives information from the sensing unit 42, and generates an AT control allowable space. The AT control allowable space corresponds to the allowable security space in the above-mentioned embodiments.

The determination-system control platform 101 in the second hierarchy generates an AT control space with the following taken into account: the information of the AT control allowable space from the cognition-system control platform 201 in the second hierarchy 11; the information of the AT control fundamental space from the operation-system control platform 501 in the first hierarchy 10; the information of a vehicle stabilization control fundamental space generated on the operation-system control platform 302 in the third hierarchy 12; and the information of the command space based on a command signal from the driver command 400. "Taking into account" referred to here means that a portion where the respective spaces (in other words, ranges) overlap one another is established as a control request feasible range. The determination-system control platform 101 requests the cognition-system control platform 201 to transmit information for execution determination. The information of vehicle stabilization control fundamental space, transmitted from the operation-system control platform 302 in the third hierarchy 12 to the determination-system control platform 101 in the second hierarchy 11 refers to, for example, the following: a slip angle at each wheel and action force on the vehicle at four wheels' points of ground contact with the road surface, such as driving torque and braking torque on each wheel. (The action force is road surface reaction force, in other words, and is equivalent to tire generative force). When the AT control space is considered, it is divided into two elements, or controllable ranges. The first is a controllable range corresponding to execution determination which is based on when a wheel stabilization control basic space, described later, is established. The first controllable range is based on information transmitted from the operation-system control platform 302 in the third hierarchy 12, the command space, and the AT control allowable space. The second is a controllable range corresponding to execution determination which is based on when an "allowable movement space, described later, in which driving torque required for the axle is converted into engine torque" is established. The second controllable range is based on information from the operation-system control platform 501 in the first hierarchy 10, the command space, and the AT control allowable space.

Figure 9:
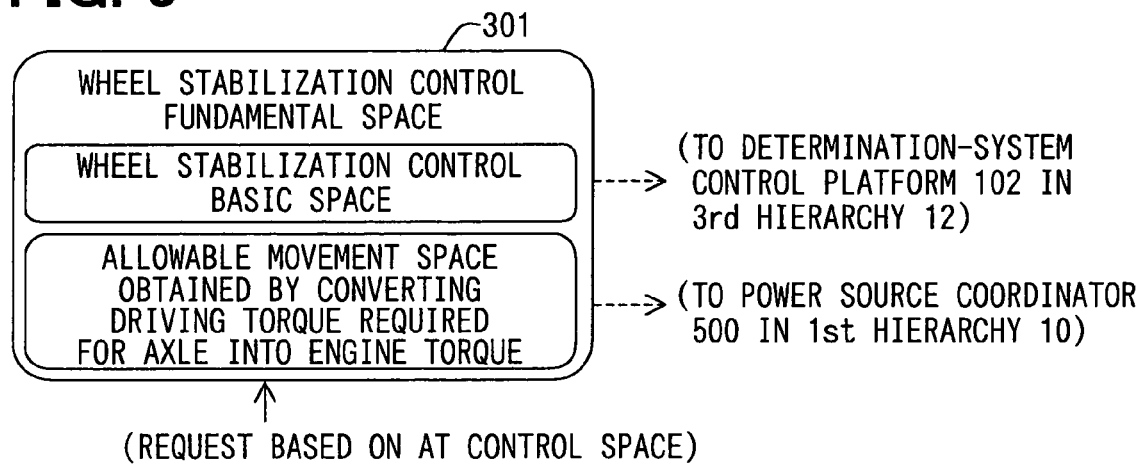
FIG. 9 is a drawing illustrating the details of the operation-system control platform in a second hierarchy.

The operation-system control platform 301 in the second hierarchy 11 receives, from the determination-system control platform 101, a control request which is based on the control request feasible range of the AT control space. Then the operation-system control platform transmits a drive request to the individual control device (AT in this case) belonging to the operation-system device 92. Further, as illustrated in FIG. 9, the operation-system control platform 301 transmits the information of the allowable movement space to the power source coordinator 500 based on the result of detection and/or computation at the AT status sensing unit 72 and the information of the AT control space. The information of the allowable movement space is obtained by converting driving torque required for the axle into engine torque. Further, the following is transmitted from the determination-system control platform 301 to the determination-system control platform 102 in the third hierarchy 12: a wheel stabilization control basic space as fundamental information for a wheel stabilization control space generated on the determination-system control platform 102 in the third hierarchy 12. The wheel stabilization control fundamental space is an allowable movement space corresponding to the information of torque transmitted from the axle to each wheel with the following taken into account: the efficiency of torque transmission from the engine to the AT when the AT is driven based on the AT control fundamental space, for example.

Next, description will be given to the constitution of each platform and the like in the third hierarchy 12. The cognition-system device 83 in the third hierarchy 12 includes a tire monitor which detects the air pressure of tires. The sensing unit 43 corresponding to the cognition-system device 83 in the third hierarchy 12 includes a tire inflation pressure sensor. The tire inflation pressure sensor transmits signals indicating the result of detection from time to time to the cognition-system control platform 202 in the third hierarchy 12. Further, the following constitution may be adopted: when receiving a detection request from the cognition-system control platform 202, the cognition-system device 83 transmits a request to the sensing unit 43, and, in response to the transmitted request, the sensing unit 43 transmits the result of detection to the cognition-system control platform 202.

The operation-system devices 93 in the third hierarchy 12 include a known antiskid control device (ABS device) and traction control device (TRC device). The operation-system devices 93 include devices for controlling the movement (e.g. slip) of wheels. The sensing unit corresponding to the operation-system devices 93 in the third hierarchy 12 is a wheel sensing unit 73. The wheel sensing unit 73 senses or computes the wheel speed (Vw) of each wheel, the vehicle body speed (Vb), the slip ratio of each wheel, the angle of steering wheel determined from a steering angle, and the like. The slip ratio is computed as an index of driving force transmission efficiency which indicates how much driving force received by each wheel from the axle (drive axle) is utilized as propelling force between the wheel and the road surface. These results of sensing or computation are transmitted from time to time to the operation-system control platform 302 in the third hierarchy 12. Further, the following constitution may be adopted: based on a request from the operation-system control platform 302 to the operation-system devices 93, the operation-system devices 93 issue a request to the wheel sensing unit 73; then, the wheel sensing unit 73 carries out transmission to the operation-system control platform 302 in accordance with the request.

The cognition-system control platform 202 in the third hierarchy 12 generates a wheel stabilization allowable space as an allowable security space based on information from the sensing unit 43. With respect to the wheel stabilization allowable space, the limit of friction circle to which road surface reaction force can be received may be set. At this time, consideration is given to, for example, deformation in the rubber part and then the carcass part of tires under the present tire inflation pressure on a wheel-by-wheel basis.

The determination-system control platform 102 in the third hierarchy 12 generates a wheel stabilization control space based on the following: the command space based on a command signal from the driver command 400; the wheel stabilization allowable space generated on the cognition-system control platform 202; the wheel stabilization control fundamental space (or the wheel stabilization control basic space of the wheel stabilization control fundamental space) generated on the operation-system control platform 301 in the second hierarchy 11; and a vehicle safety control fundamental space generated on the operation-system control platform 303 in the fourth hierarchy 13. Further, the determination-system control platform 102 requests the cognition-system control platform 202 to transmit information for use in the generation of the wheel stabilization control space. The vehicle safety control fundamental space transmitted from the operation-system control platform 303 in the fourth hierarchy 13 to the determination-system control platform 102 in the third hierarchy 12 is a wheel stabilization command space. This wheel stabilization command space is indicated by requests of torque applied to each wheel to stabilize the vehicle, in other words, minimize longitudinal vibration and lateral vibration, or the like. Therefore, on the determination-system control platform 102 in the third hierarchy 12, a portion where the command space, wheel stabilization control space, wheel stabilization control fundamental space, and wheel stabilization command space overlap one another is generated as a control request feasible range. This control request feasible range corresponds to execution determination for the operation-system control platform 302 in the third hierarchy 12.

When the wheel stabilization control space is considered, it is divided into two elements, or controllable ranges. The first is a controllable range corresponding to execution determination which is based on when a vehicle stabilization control basic space, described later, is established. The first controllable range is based on information transmitted from the operation-system control platform 303 in the fourth hierarchy 13, the command space, and the wheel stabilization allowable space. The second is a controllable range corresponding to execution determination which is based on when an "allowable movement space based on the driving torque of each wheel and/or road surface reaction force," described later, is established. The second controllable range is based on information from the operation-system control platform 301 in the second hierarchy 11, the command space, and the wheel stabilization allowable space.

Figure 10:
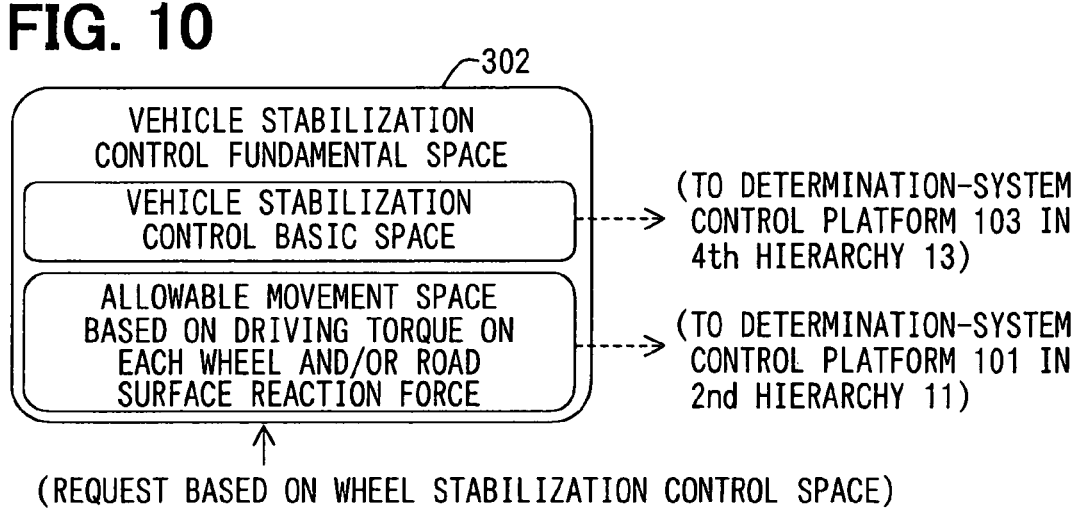
FIG. 10 is a drawing illustrating the details of the operation-system control platform in a third hierarchy.

The operation-system control platform 302 in the third hierarchy 12 transmits a request to carry out control and information to the operation-system devices 93 in the third hierarchy 12 based on a control request based on the control request feasible range from the determination-system control platform 102. Further, on the operation-system control platform 302, a vehicle stabilization control fundamental space is generated based on information from the wheel sensing unit 73. As illustrated in FIG. 10, the vehicle stabilization control fundamental space contains the following: the information of the allowable movement space based on the present state of the driving torque and/or road surface reaction force of each wheel, transmitted to the determination-system control platform 101 in the second hierarchy 11; and the information of the vehicle stabilization control basic space, transmitted to the determination-system control platform 103 in the fourth hierarchy 13. The vehicle stabilization control basic space is a vehicle movement control space computed based on a friction circle with consideration given to longitudinal force and lateral force which are the road surface reaction force on the tire of each wheel. In the vehicle stabilization control basic space, the driving force exerted on each wheel, braking force, and the degree of margin in circling movement are considered relative to the tires' point of ground contact with the road surface for prevention of wheel slip and application of vibration to the vehicle body.

Next, description will be given to the constitution of each control platform and the like in the fourth hierarchy 13. In this embodiment, the cognition-system devices 84 do not exist in the fourth hierarchy 13. However, a request indicating device having the same functions as that described in connection with the cognition-system device 82 in the second hierarchy 11 may be provided for the enhancement of versatility from car model to car model or vehicle grade to vehicle grade. In this embodiment, the constitution of the sensing unit 44 corresponding to the cognition-system control platform 203 in the fourth hierarchy 13 does not exist, either. However, a control domain may be ensured in the logic.

The operation-system devices 94 in the fourth hierarchy 13 include a known vehicle behavior control device and rollover prevention device. The vehicle behavior control device is a device which, when the vehicle skids as in oversteer or understeer, corrects the traveling direction of the vehicle by braking force arising from engine power and/or the brake. The rollover prevention device is a device which, when the vehicle takes a short turn or makes the like movement, prevents the vehicle body from rolling over using engine power and/or braking force arising from the brake.

The vehicle sensing unit 74 which is a sensing unit belonging to the operation-system devices 94 in the fourth hierarchy 13 senses or computes the following: vehicle body longitudinal acceleration (Gx), vehicle body lateral acceleration (Gy), yaw rate ($\gamma$) around the center of gravity of vehicle body, turning angle ($\Sigma\gamma$) around the center of gravity of vehicle body, and the like. The results of sensing and the results of computation are transmitted from time to time to the operation-system control platform 303 in the fourth hierarchy 13. Further, the following constitution may be adopted: based on a request from the operation-system control platform 303 to the operation-system devices 94, the operation-system devices 94 issue a request to the vehicle sensing unit 74; then the vehicle sensing unit 74 transmits the result of sensing or the result of computation to the operation-system control platform 303 in accordance with the request.

The cognition-system control platform 203 in the fourth hierarchy 13 generates a vehicle stabilization allowable space based on information from a sensing unit 44. However, since sensors or computing units belonging to the sensing unit 44 do not exist in this embodiment, it is possible to refrain from generating the vehicle stabilization allowable space. Or, when sensors or computing units belonging to the sensing unit 44 do no exist, the same contents as those of the wheel stabilization allowable space generated on the cognition-system control platform 202 in the third hierarchy 12, or the immediately lower hierarchy, may be used as a virtual vehicle stabilization allowable space. In this case, the information of the vehicle stabilization allowable space is transmitted as an allowable security space from the cognition-system control platform 203 to the determination-system control platform 103 in the fourth hierarchy 13.

On the determination-system control platform 103 in the fourth hierarchy 13, a vehicle stabilization control space as a control request feasible range is generated based on a portion where the following overlap one another: the command space based on a command signal from the driver command 400; the vehicle stabilization allowable space from the cognition-system control platform 203; the vehicle stabilization control fundamental space (or the vehicle stabilization control basic space of the vehicle stabilization control fundamental space) transmitted from the operation-system control platform 302 in the third hierarchy 12; and a vehicle stabilization command space generated on the operation-system control platform 304 in the fifth hierarchy 14. Further, information can also be requested of the cognition-system control platform 203 for generating a vehicle stabilization control space.

When the vehicle stabilization control space is considered, it is divided into two elements, or controllable ranges. The first is a controllable range corresponding to execution determination which is based on when a vehicle safety control basic space, described later, is established. The first controllable range is based on information transmitted from the operation-system control platform 304 in the fifth hierarchy 14, the command space, and the vehicle stabilization allowable space. The second is a controllable range corresponding to execution determination which is based on when a "wheel stabilization command space," described later, is established. The second controllable range is based on information from the operation-system control platform 302 in the third hierarchy 12, the command space, and the vehicle stabilization allowable space.

Figure 11:
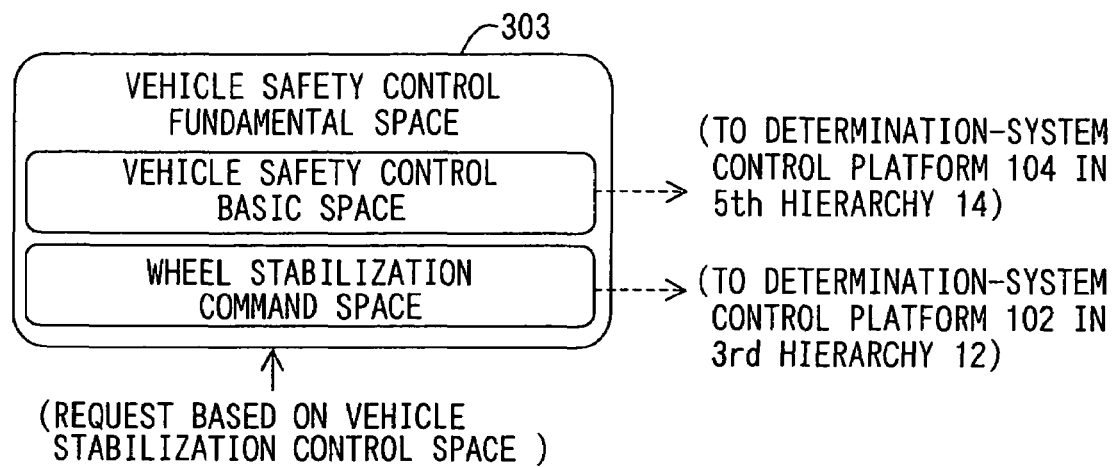
FIG. 11 is a drawing illustrating the details of the operation-system control platform in a fourth hierarchy.

On the operation-system control platform 303 in the fourth hierarchy 13, a vehicle safety control fundamental space is generated based on the information of the vehicle stabilization control space from the determination-system control platform 103 and information from the vehicle sensing unit 74. As illustrated in FIG. 11, this vehicle safety control fundamental space includes the information of the wheel stabilization command space and a vehicle safety control basic space. The vehicle safety control basic space is information which is based on when a vehicle safety control space is generated on the determination-system control platform 104 in the fifth hierarchy 14, and defines the scope of requests to the higher hierarchy. Conversely, the wheel stabilization command space is information for instructing control objectives from the higher hierarchy to the lower hierarchy. The vehicle safety control basic space defines the ranges of driving of the operation-system devices 74 to 71 based on the information of the vehicle stabilization control space from the determination-system control platform 103 in the fourth hierarchy 13 and information from the vehicle sensing unit 74. These ranges of driving are ranges where the vehicle is not put in the danger of skid, acceleration/deceleration slip, rollover, or the like.

Next, description will be given to the constitution of each control platform and the like in the fifth hierarchy 14. As the cognition-system devices 85 in the fifth hierarchy 14, a navigation system, adaptive cruise control system, and the like can be named. The navigation system includes a car location recognition device. The above-mentioned request indicating device may be independently included in the cognition-system devices 85.

The sensing unit 45 in the fifth hierarchy 14 includes a following distance sensor and map information. Information from the sensing unit 45 is transmitted from time to time to the cognition-system control platform 204 in the fifth hierarchy 14. Or, the information may be transmitted to the cognition-system control platform 204 in accordance with requests from the cognition-system devices 85.

The operation-system devices 95 in the fifth hierarchy 14 include an adaptive cruise control system and the like. The adaptive cruise control system outputs, to the vehicle sensing unit 75 in the fifth hierarchy 15, requests to transmit the results of detection and/or computation. This embodiment is constituted so that this adaptive cruise control system is included both in the cognition-system devices 85 and in the operation-system devices 95. However, even if such a constitution that the adaptive cruise control system is included in both the devices 85 and 95, two adaptive cruise control systems need not be provided, and the foregoing may be considered just as positioning in communications.

As the sensing unit corresponding to the fifth hierarchy 14, the vehicle sensing unit 75 exists. The vehicle sensing unit 75 transmits the results of detection and/or the results of computation from time to time to the operation-system control platform 304 in the fifth hierarchy 15. Or, the vehicle sensing unit may transmit the results of detection and/or the results of computation in accordance with requests transmitted from the operation-system device 95 in response to a request from the operation-system control platform 304 to the operation-system devices 95. The vehicle sensing unit 75 may be constituted by the same as the vehicle sensing unit 74 in the fourth hierarchy 13. In this case as well, two sensors of each type need not be provided for the two hierarchies 13 and 14, and the results of detection and/or the results of computation only have to be transmitted to both the fourth and fifth hierarchies 13 and 14 in terms of communications.

The cognition-system control platform 204 in the fifth hierarchy 14 receives information from the sensing unit 45 in the fifth hierarchy 14, and generates an environmental safety allowable space as an allowable security space. The environmental safety allowable space may adopt the contents of the allowable security space generated on the cognition-system control platform 2 in the fourth embodiment, described using FIG. 4 and FIG. 5. The cognition-system control platform 204 requests information from the cognition-system devices 85. For example, the following information can be requested from the navigation system: map data on the spot 30 m ahead or at the point of time three seconds later from the point at which the vehicle is running when the present computation is carried out; information on the presence or absence of a vehicle in the space ahead of this vehicle on the right; and/or a following distance with the vehicle in the space ahead of this vehicle on the right.

On the determination-system control platform 104 in the fifth hierarchy 14, a vehicle safety control space is generated based on the following: the command space based on a command signal from the driver command 400; the environmental safety allowable space from the cognition-system control platform 204; and the vehicle safety control fundamental space (vehicle safety control basic space) from the operation-system control platform 303 in the fourth hierarchy 13. This vehicle safety control space may be generated based on the overlap portion of these spaces. Report requests are transmitted from the determination-system control platform 104 to a reporting device 401. This report request is transmitted when an overlap portion does not exist in the command space by the driver, the environmental safety allowable space and/or the vehicle safety control basic space. This state can occur when the driver is performing dangerous driving or is likely to be put in danger, for example, when the road is sharply curved two seconds later and the present vehicle speed is high. The determination-system control platform 104 also requests the cognition-system control platform 204 to transmit information for generating a vehicle safety control space.

When the vehicle safety control space on the determination-system control platform 104 is considered, it is divided into two elements, or controllable ranges. The first is a controllable range corresponding to execution determination which is based on when a vehicle stabilization command space, described later, is established. The first controllable range is based on information transmitted from the operation-system control platform 303 in the fourth hierarchy 13, the command space, and the vehicle stabilization allowable space. The second is a controllable range corresponding to execution determination which is based on when a "drive request for a human-machine interface," described later is established. The second controllable range is based on the vehicle stabilization command space, described later, transmitted form the operation-system control platform 304 in the fifth hierarchy 14, the command space, and the vehicle stabilization allowable space.

Figure 12:
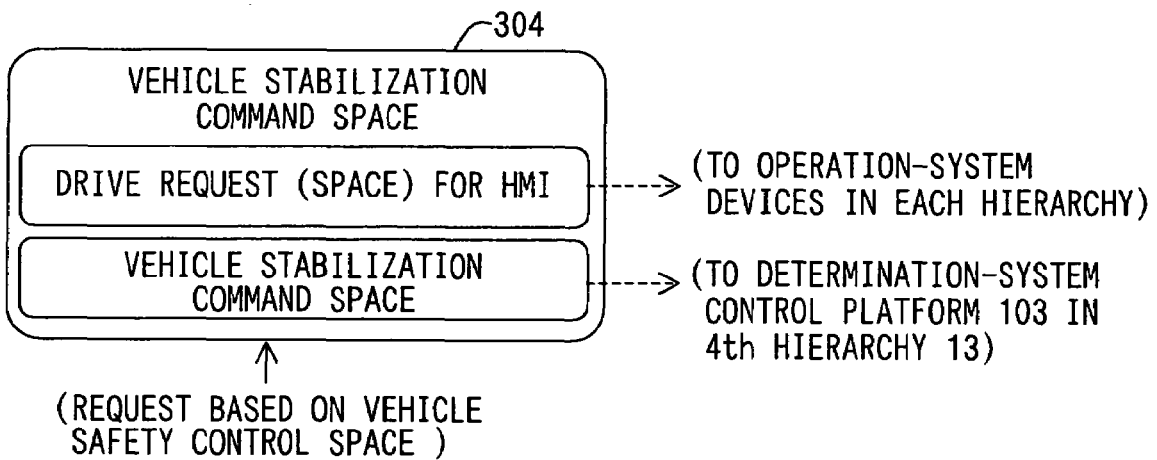
FIG. 12 is a drawing illustrating the details of the operation-system control platform in a fifth hierarchy.

As illustrated in FIG. 12, on the operation-system control platform 304 in the fifth hierarchy 14, a vehicle stabilization command space is generated based on the information of the vehicle safety control space from the determination-system control platform 104 in the fifth hierarchy 14 and information from the vehicle sensing unit 75. This vehicle stabilization command space is information transmitted to the determination-system control platform 103 in the fourth hierarchy 14, and corresponds to the allowable movement space. Further, on the operation-system control platform 304, drive requests for HMI (Human-Machine Interface) are generated based on the vehicle safety control space from the determination-system control platform 104. The HMI refers to a function of reporting an anomaly or danger, if any, to the occupants using the operation-system devices 95 to 91. Therefore, a drive request for HMI is generated in parallel with transmission from the determination-system control platform 104 in the fifth hierarchy 14 to the reporting device 401, as mentioned above, or as an alternative thereto. The specific examples of drive requests for HMI are as follows: the engine is subjected to lag control to produce abnormal vibration in the engine mount, and the occupants are informed of the anomaly or danger by vibration noise; and brake oil pressure is vibrated by the ABS device or the like, and the occupants are informed by vibration from the brake pedal.

Figure 8:
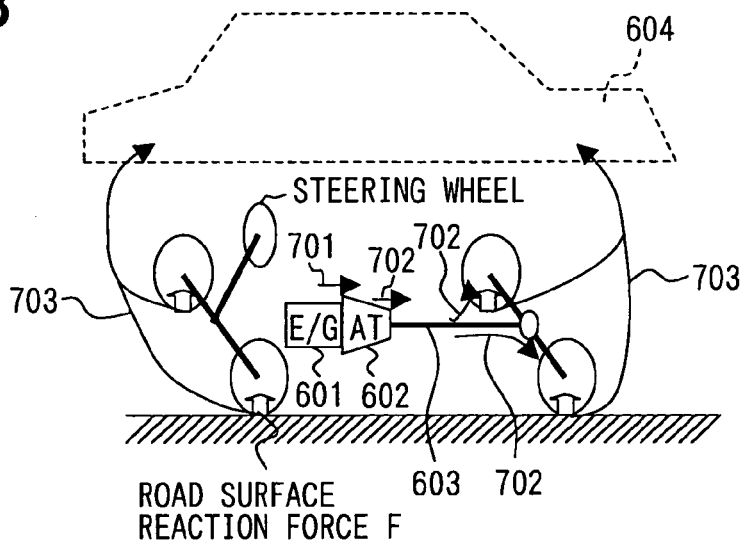
FIG. 8 is a model diagram illustrating an example of an idea for hierarchy construction.

The hierarchies of the thus constructed control structure are enhanced in functions as it goes up from the first hierarchy 10 to the fifth hierarchy 14. As described above, this enhancement of functions is set in the order in which engine power, which is motive power for moving the vehicle body, is transmitted, as illustrated in FIG. 8.

More specific description will be given. From the first hierarchy 10 to the second hierarchy 11, the scope of control is expanded from a control model of one action power point of the power of the engine 601 to a control model of action force exerted on the axle 603 in the AT 602, as indicated by arrow 701.

From the second hierarchy 11 to the third hierarchy 12, the scope of control is expanded from a control model of an action power point of the axle 603 to a control model of at least four action power points of driving force exerted on each wheel or road surface reaction force F, as indicated by arrow 702. Transmission of action force of the axle 603 to the front wheels can be considered to be implemented through the vehicle body 604.

From the third hierarchy 12 to the fourth hierarchy 13, the scope of control is expanded from a control model of four action power points of wheels to an overall control model of the movement of the vehicle body 604, as indicated by arrow 703.

From the fourth hierarchy 13 to the fifth hierarchy 14, the scope of control is expanded to a control model based on the viewpoint of safety with the ambient environment taken into account.

The cognition-system devices, operation-system devices, sensors, and the like are disposed in such form that they correspond to their respective hierarchies. As mentioned above, the scope of control differs from hierarchy to hierarchy, and the operation-system devices belonging to the individual hierarchies and control functions differ from hierarchy to hierarchy. However, each hierarchy is provided with the cognition-system, determination-system, and operation-system platforms in common.

Therefore, even if an operation-system device and/or cognition-system device belonging to any hierarchy fails or is not provided in any car mode or grade, no problem arises. Each space can be generated by only information provided, in respective hierarchies, and control can be implemented as much as possible. Even when a hierarchy does not exist in any car model or grade, similarly, no problem arises. The hierarchy can be skipped, and in the higher and lower hierarchies, each space can be generated by only information provided, and control can be implemented as much as possible. As an example, the following assumption will be made: a car model does not have a cognition-system device 85, operation-system device 95, sensing unit 45, or vehicle sensing unit 75 in the fifth hierarchy 14, and the fifth hierarchy 14 does not substantially exist. Even in this case, the control structure, including the first hierarchy 10 through the fifth hierarchy 14, constructed in the car model of the highest grade can be used for the above-mentioned car model without change, and control can be carried out in the first to fourth hierarchies. As another example, it will be assumed that a vehicle of a lower grade does not have a cognition-system device 85 and 84, operation-system device 95 and 94, sensing unit 45 and 44, or vehicle sensing unit 75 and 74 in the fifth hierarchy 14 or the fourth hierarchy 13. Even in this vehicle, the control structure, including the first hierarchy 10 through the fifth hierarchy 14, constructed in a car model of higher grade can be used without change, and the vehicle of the lower grade is controlled in the first to third hierarchies.

However, in these cases, the unused capacity (e.g. number of bits) in ECU (Electronic Control Unit) is increased. In this case, therefore, hierarchies in which cognition-system devices, operation-system devices, sensors, or the like belonging to the hierarchies do not exist at all may be completely eliminated. In these cases, the following measures are advantageous: ICs are collectively disposed on boards on a hierarchy-by-hierarchy basis or ICs are grouped on a hierarchy-by-hierarchy basis.

When the development of a vehicle is started with a lower grade, for example, the following measures can be taken: control is constructed with a control structure having only the first hierarchy 10 and the second hierarchy 11, and the third hierarchy 12 to the fifth hierarchy 14 are added each time the development of the vehicle is expanded to a higher car model.

Figure 7A:
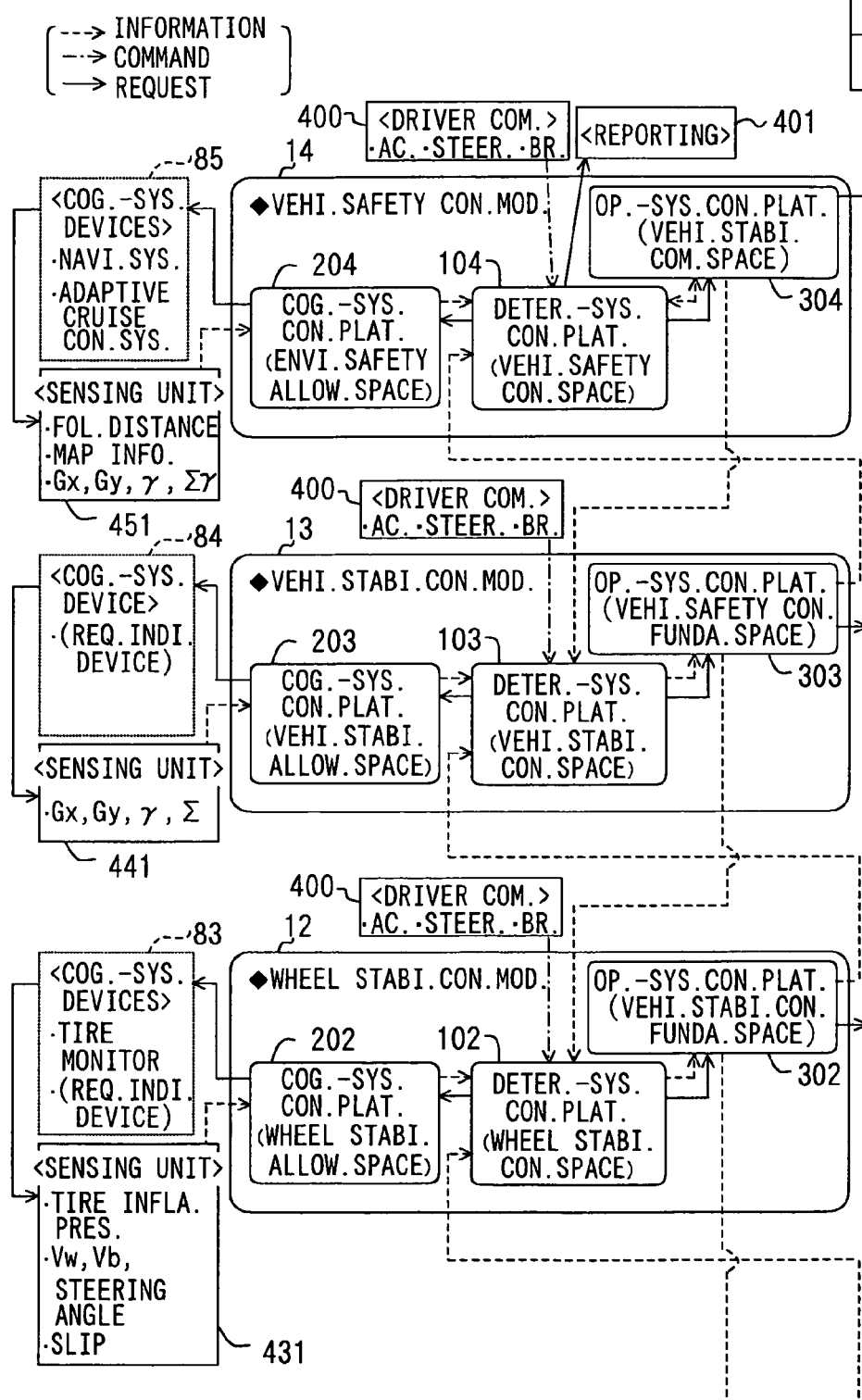
FIG. 7 including FIG. 7A
FIG. 7B is a block diagram illustrating a sixth embodiment.
Figure 7B:
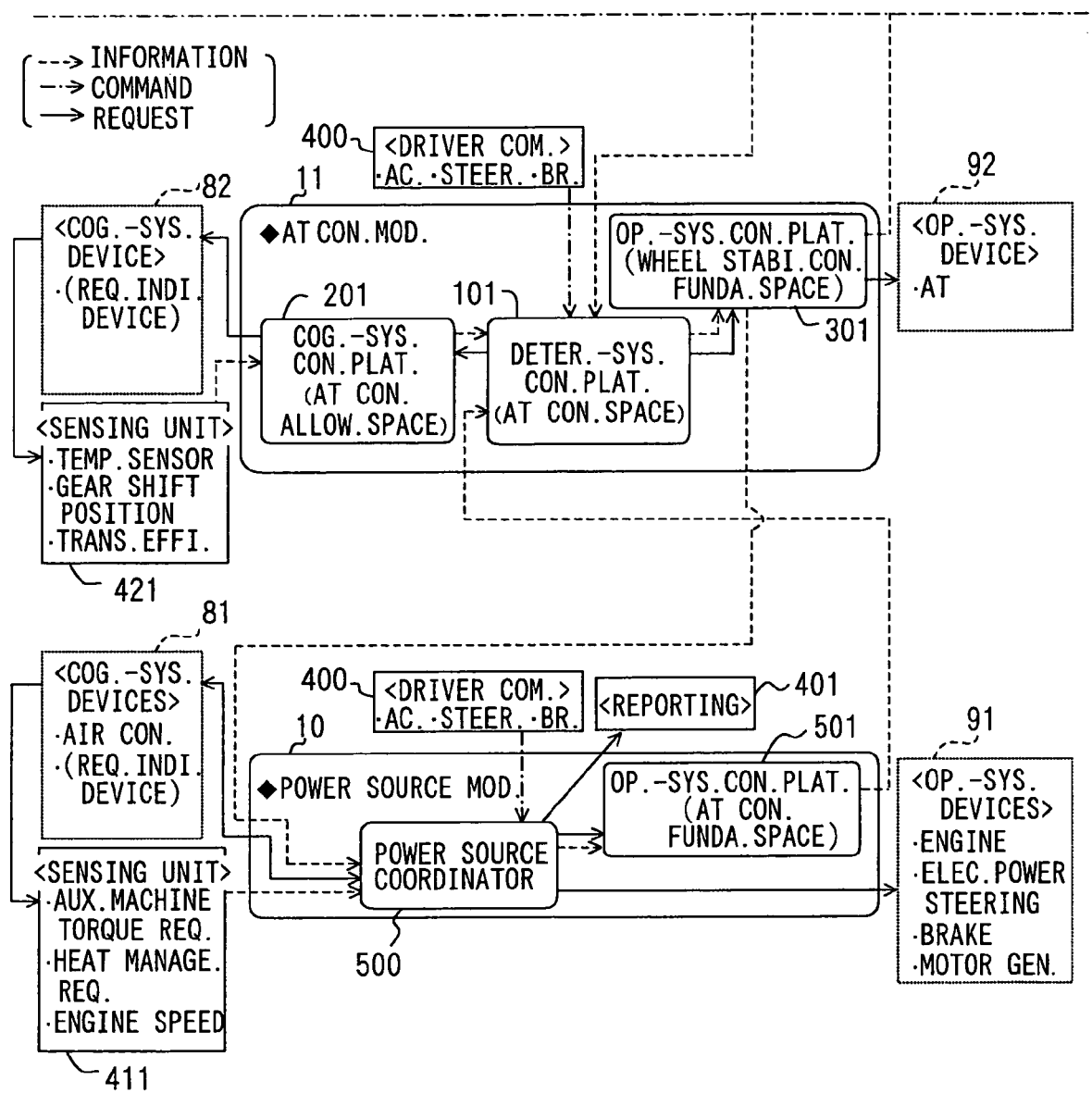

Next, a sixth embodiment will be described based on FIG. 7 including FIG. 7*a* and FIG. 7*b*. The description of items having the same functions as in the fifth embodiment, described referring to FIG. 6 including FIG. 6*a* and FIG. 6*b*, will be omitted. In the fifth embodiment, the sensing units 41 to 45 are provided in correspondence with the cognition-system devices 81 to 85 in the respective hierarchies 10 to 14, and the sensing units 71 to 75 are provided in correspondence with the operation-system devices 91 to 95 in the respective hierarchies 10 to 14. In the sixth embodiment, the sensing units are put together into one group in each hierarchy.

More specific description will be given. In the sixth embodiment, the sensing unit 411 corresponding to the power source coordinator 500 in the first hierarchy 1 0 is provided both with sensors and computing functions corresponding to the cognition-system devices 81 and with sensors and computing functions corresponding to the operation-system devices 91. Therefore, the sensing unit 411 not only computes the auxiliary machine torque desired value and the heat management desired value but also detects the engine speed, steering angle, and the like. Information on the results of detection and/or computation is conveyed to the power source coordinator 500, and is transmitted from the power source coordinator 500 to the operation-system control platform 501.

The sensing unit 421 corresponding to the cognition-system platform 201 in the second hierarchy 11 is provided both with sensors and computing functions corresponding to the cognition-system device 82 and with sensors and computing functions corresponding to the operation-system device 92. Therefore, the sensing unit 421 has not only a temperature sensor and the like but also functions of detecting or computing the gear shift position and the transmission efficiency of AT. Information detected and/or computed at the sensing unit 421 is transmitted to the cognition-system control platform 201, and is transmitted from the cognition-system control platform 201 to the operation-system control platform 301 through the determination-system control platform 101.

The sensing unit 431 corresponding to the cognition-system control platform 202 in the third hierarchy 12 is provided both with sensors and computing functions corresponding to the cognition-system devices 83 and with sensors and computing functions corresponding to the operation-system devices 93. Therefore, the sensing unit 431 detects and/or computes not only the tire inflation pressure but also the wheel speed, vehicle body speed, steering angle, slip ratio, and the like. Information transmitted from the sensing unit 431 to the cognition-system control platform 202 is transmitted to the operation-system control platform 302 through the determination-system control platform 102.

The sensing unit 441 corresponding to the cognition-system control platform 203 in the fourth hierarchy 13 is provided both with sensors and computing functions corresponding to the cognition-system device 84 and with sensors and computing functions corresponding to the operation-system devices 94. Therefore, the sensing unit 441 detects and/or computes the longitudinal acceleration, lateral acceleration, yaw, and turning angle. Information transmitted from the sensing unit 441 to the cognition-system control platform 203 is transmitted to the operation-system control platform 303 through the determination-system control platform 103.

The sensing unit 451 corresponding to the cognition-system control platform 203 in the fifth hierarchy 14 is provided both with sensors and computing functions corresponding to the cognition-system devices 85 and with sensors and computing functions corresponding to the operation-system devices 95. Therefore, the sensing unit 451 detects and/or computes not only the following distance and map information but also the longitudinal acceleration, lateral acceleration, yaw, and turning angle. Information transmitted from the sensing unit 451 to the cognition-system control platform 204 is transmitted to the operation-system control platform 304 through the determination-system control platform 104.

The constitution of the fifth embodiment is roughly divided into five: cognition-system devices, sensing units corresponding thereto, operation-system devices, sensing units corresponding thereto, and control platforms. The constitution of the above-mentioned sixth embodiment is divided into four: cognition-system devices, operation-system devices, sensing units, and control platforms. When the present invention is thus constituted, substantially the same action and effect as in the fifth embodiment can be obtained. In a case where some sensors are provided both for the cognition-system devices 81 to 85 and for the operation-system devices 91 to 95 in the same hierarchy, a task is posed in the fifth embodiment. Information must be transmitted from the sensors both to the sensing unit corresponding to the operation-system devices and to the sensing unit corresponding to the cognition-system devices. In the sixth embodiment, this is not required, and the amount of wiring and/or traffic can be reduced.

The embodiments of the present invention are not limited to the foregoing, and the present invention can be modified in various manners. Some examples will be taken. In the hierarchical structure of control constructed as mentioned above, the hierarchies 11 to 14, excluding the first hierarchy 10 for basic performance, respectively include the cognition-system control platform, determination-system control platform, and operation-system control platform. When these hierarchies are considered from the viewpoint-of "request" from the determination-system control platform, both the cognition-system control platform and the determination-system control platform issue requests to the same hierarchy. When these hierarchies are considered from the viewpoint of "information" to the determination-system control platform, the cognition-system control platform is positioned in the same hierarchy as the determination-system control platform but it obtains information from the operation-system control platform from the immediately lower and higher hierarchies. Therefore, the hierarchies can be divided as described below, not based on FIG. 6 including FIG. 6a and FIG. 6b, and even in this case, the same action and effect as in the above-mentioned embodiments can be produced.

More specific description will be given. As a modification to the fifth and sixth embodiments, the present invention is constituted so that the first hierarchy 10 contains the power source coordinator 500, cognition-system devices 81, sensing unit 41, operation-system devices 91, and sensing unit 71. That is, the first hierarchy 10 is provided only with a function of adjusting and actuating the engine, steering, and brake which are parts related to the basic performance of the vehicle, and is not provided with a function of generating control spaces like the AT control fundamental space.

As a modification to the fifth and sixth embodiments, the present invention is constituted so that the second hierarchy is provided with the cognition-system control platform 201, determination-system control platform 101, cognition-system devices 82, sensing unit 42, operation-system devices 92, and AT status sensing unit 72. The second hierarchy is further provided with a function of generating the "information of the allowable movement space based on the present state of the driving torque on each wheel and/or road surface reaction force" of the operation-system control platform 501 and the operation-system control platform 302.

As a modification to the fifth and sixth embodiments, the present invention is constituted so that the third hierarchy is provided with the cognition-system control platform 202, determination-system control platform 102, cognition-system devices 83, sensing unit 43, operation-system devices 93, and wheel sensing unit 73. The third hierarchy is further provided with a function of generating: the "wheel stabilization control basic space" of the operation-system control platform 301; the "information of the allowable movement space obtained by converting the driving torque required for the axle into engine torque" of the operation-system control platform 301; and the "wheel stabilization command space" of the operation-system control platform 303.

As a modification to the fifth and sixth embodiments, the present invention is constituted so that the fourth hierarchy is provided with the cognition-system control platform 203, determination-system control platform 103, cognition-system devices 84, sensing unit 44, operation-system devices 94, and vehicle sensing unit 74. The fourth hierarchy is further provided with a function of generating the "vehicle stabilization control basic space" of the operation-system control platform 302 and the "vehicle stabilization command space" of the operation-system control platform 304.

As a modification to the fifth and sixth embodiment, the present invention is constituted so that the fifth hierarchy is provided with the cognition-system control platform 204, determination-system control platform 104, cognition-system devices 85, sensing unit 45, operation-system devices 95, and vehicle sensing unit 75. The fifth hierarchy is further provided with a function of generating the "vehicle safety control basic space" of the operation-system control platform. Of the operation-system control platform 304, the function of generating the "drive requests for HMI" may be contained in the fifth hierarchy as a modification to the fifth and sixth embodiments or may be newly provided as a sixth hierarchy.

In the fifth and sixth embodiments, the contents of driver commands from the driver command 400 are the same in every hierarchy, but they may be made different between higher hierarchies and lower hierarchies. An example will be taken. Driver commands to the power source coordinator 500 in the first hierarchy 10 and/or the determination-system control platform 101 in the second hierarchy 11 are transmitted the moment that the occupant's accelerator operation, steering wheel operation, or brake pedal operation is directly converted into a signal. Driver commands to any of the third hierarchy 12 to the fifth hierarchy 14 or all the hierarchies are transmitted after a signal corresponding to the occupant's accelerator operation, steering wheel operation, or brake pedal operation is processed at the driver command 400. As processing at this time, for example, signals can be integrated and/or differentiated for a predetermined time. An example will be taken. Since lower-level hierarchies are for controlling the basic functions of the vehicle, the driver's intention ought to be reflected in a timely manner as much as possible in these hierarchies. Since higher-level hierarchies support sophisticated functions, the driver's intention may be reflected over a certain period (e.g. 500 ms) in these hierarchies.

In the fifth embodiment, the cognition-system devices 81 to 85 and the sensing units 41 to 45 are separated from each other, and the operation-system devices 91 to 95 and the sensing units 71 to 75 are separated from each other. The constitution of the present invention is not limited to this: the sensing units 41 to 45 may be included in the cognition-system devices 81 to 85; and the sensing units 71 to 75 may be included in the operation-system devices 91 to 95. In the sixth embodiment, the cognition-system devices 81 to 85 and the sensing units 411, 421, 431, 441, and 451 are separated from each other. The constitution of the present invention is not limited to this: the sensing units 411, 421, 431, 441, and 451 may be included in the cognition-system devices 81 to 85.

In the fifth and sixth embodiments, the hierarchy is divided into five levels; however, more hierarchy levels can be constructed. For example, for four-wheel-drive vehicle (4WD), the hierarchy of a model for 4WD control may be inserted between the AT control model in the second hierarchy 11 and the wheel stabilization control model in the third hierarchy 12. This model for 4WD control may be constituted so that on the operation-system control platform 301 in the second hierarchy 11, a differential control fundamental space is generated, in place of a wheel stabilization control fundamental space, based on the AT control space. This differential control fundamental space is generated as an allowable movement space for front and rear wheel driving force distribution by LSD (Limited Spread Differential) in 4WD control. In the newly added hierarchy, a wheel stabilization control fundamental space can be generated based on differential control.

In the fifth and sixth embodiments, the determination-system control platform 101 to 104 in each hierarchy 11 to 14 does not receive information from the operation-system control platform 301 to 304 in the same hierarchy. The constitution of the present invention is not limited to this. For example, the following constitution may be adopted: information on operating state, failed state, and/or the like is transmitted from the operation-system devices 92 to 95 in a hierarchy is transmitted to the operation-system control platform 301 to 304 belonging to the same hierarchy; and this information is transmitted to the determination-system control platform 101 to 104 in the same hierarchy by the operation-system control platform 301 to 304 in the same hierarchy. A specific example will be taken. In the third hierarchy 12, the failed state and the like of the ABS device or the like are transmitted from the operation-system devices 93. On the operation-system control platform 302, they are used as information for generating an allowable movement space based on the functions/operating state of the operation-system devices 93 in the same hierarchy. This information of the allowable movement space is transmitted from the operation-system control platform 302 to the determination-system control platform 102, and is used as information for generating a wheel stabilization control space.

In the fifth and sixth embodiments, the reporting device 401 is provided only in the highest and lowest hierarchies, that is, in the first hierarchy 10 and the fifth hierarchy 14. Alternatively, the reporting device may be provided in every hierarchy.

In the fifth and sixth embodiments, on the control platform in the first hierarchy 10, the power source coordinator 500 is defined as what adjusts the driving force from the operation-system devices 91. In these embodiments, what corresponds to the cognition-system control platform or determination-system control platform is not constituted in the first hierarchy. However, the power source coordinator 500 in the above-mentioned embodiments can be considered to include both the cognition-system control platform and the determination-system control platform in the other hierarchies. More specific description will be given. The first hierarchy 10 is a hierarchy with consideration given to the basic performance of the vehicle. Therefore, there are not so many conditions for the elements of the allowable security space on the cognition-system control platform or the controllable range on the determination-system control platform, and/or the communication time must be shortened. Thus, it can be said that these platforms should be preferably put together into one. Aside from this idea, the first hierarchy 10 may also be provided with the cognition-system control platform and the determination-system control platform like the second and higher hierarchies. At this time, the following constitution may be adopted: the cognition-system control platform generates an allowable security space in accordance with an auxiliary machine torque desired value and a heat management desired value; and on the determination-system control platform, execution determination is generated based on the overlap space of the following: feasible control domain based on engine speed, the amount of fuel injection, and the like; the allowable security space, and the command space based on the driver command 400.

In the fifth and sixth embodiments, the operation-system devices 91 to 95 only request the respectively corresponding sensing units 71 to 75 to transmit information to the operation-system control platforms 501 and 301 to 304. In addition, the operating state, failed state, and/or the like of the operation-system devices 91 to 95 themselves may be transmitted directly to the operation-system control platforms 501 and 301 to 304 in the same hierarchies.

Similarly, the cognition-system devices 81 to 85 may transmit the operating state and/or failed state to the power source coordinator 500 and the cognition-system control platforms 201 to 204 in the same hierarchies.

When control platforms are constructed with a variety of functions distributed among a plurality of hierarchies, as in the fifth and sixth embodiments, it is desirable that ECUs should communicate with one another by decentralized control. This is because equivalent operation can be performed by decentralized control in terms of in-vehicle LAN (Local Area Network) even if different ECUs are contained in the same hierarchy.

When vehicle control is constructed as in the above-mentioned embodiments, it is desirable that common control parameters should be used for the control platforms in each hierarchy. On the operation-system device side or on the cognition-system device side, conventional control may be performed by conventional parameters. However, it is desirable that requests between the control platforms and operation-system devices in each hierarchy and between the control platforms and cognition-system devices in each hierarchy should be unified in every hierarchy. More specific description will be given. In the first hierarchy 10, the engine as an operation-system device 91 is controlled by control parameters of the amount of intake air and the amount of fuel injection, and driver commands are instructed to the power source coordinator 500 by accelerator opening (or the amount of accelerator pedal operation). With respect to operation-system devices 93 in the third hierarchy 12 and the like, for example, the braking force on the wheels is controlled by a parameter of slip ratio or wheel speed. The adaptive cruise control system, a cognition-system device 85 in the fifth hierarchy 14, uses distance or vehicle body deceleration/acceleration as a control parameter. However, in the entire hierarchies, from the first hierarchy 10 to the fifth hierarchy 14, requests between the operation-system devices and the cognition-system devices, and the control platforms in the individual hierarchies are made by "torque" in a unified manner. More specific description will be given. On the control platforms in each hierarchy, desired values transmitted from the control platforms to the outside are converted into torque and indicated. The operation-system devices and the cognition-system devices process the requests so that they can be controlled within the devices themselves before using the requests. Instead of using unified parameters in all the hierarchies, the following constitution may be adopted: parameters which are regardless of any car model, grade, and the type of engine, for example, diesel engine or gasoline engine, are established at least in each hierarchy. Or, the following constitution may be adopted: at least "torque" is used as a common parameter, and other parameters that cannot be converted into torque are used between the control platforms and the operation-system devices in each hierarchy.

The above-mentioned embodiments have been described as a control structure or control device for carrying out vehicle control using individual control devices. The present invention is applicable to a simulator used, for example, for constructing the control structure of a vehicle. More specifically, the hierarchical structure described referring to FIG. 6 including FIG. 6a and FIGS. 6b and 7 including FIG. 7a and FIG. 7b may be constructed on a computer, and simulations may be performed by appropriately setting the driving conditions for vehicles and parameters which differ from vehicle to vehicle.

What is claimed is:

1. A vehicle control information conveyance structure, a vehicle control device using the conveyance structure, and a vehicle control simulator using the conveyance structure, the conveyance structure being for information of an overall control of a vehicle having a plurality of control functions, the conveyance structure comprising:

a first hierarchy which manages at least engine power;

a second hierarchy which manages a state of driving force, or the engine power transmitted to an axle through an automatic transmission; and a third hierarchy which manages tire generative force delivered by each wheel based on at least the driving force on the axle, wherein the hierarchies are constructed from a lower level to a higher level relative to an engine, based on how the power of the engine is transmitted to a vehicle body;

wherein the first hierarchy, at a lower level comprises:

a first operation-system control platform which makes adjustment based on a plurality of cognition-system devices and a command space generated based on a driver command and desired values which have influence on engine power to generate at least a request to carry out engine control, and generates an automatic transmission control fundamental space which becomes basic information for controlling the automatic transmission in the second hierarchy; and a first determination-system control platform which generates execution determination on the engine control, wherein the second hierarchy comprises:

a second cognition-system control platform which generates an automatic transmission control allowable space based on information on outside of the vehicle and/or inside of the vehicle in order to specify a range within which control of the automatic transmission is permitted;

a second determination-system control platform which generates execution determination on the automatic transmission as a request based on any or all of the automatic transmission control fundamental space in the first hierarchy, the vehicle stabilization control fundamental space in the third hierarchy, the automatic transmission control allowable space, and the command space based on a driver command; and a second operation-system control platform which receives a request from the second determination-system control platform and transmits a control request to the automatic transmission, and receives an operating state of the automatic transmission and transmits a first allowable movement space to the first hierarchy and/or the third hierarchy, wherein the third hierarchy comprises:
a third cognition-system control platform which generates a wheel stabilization allowable space using information on outside in order to manage a road surface reaction force on each wheel;
a third determination-system control platform which generates a request to a third operation-system control platform corresponding to operation-system devices that control movement of wheels, based on any or all of the wheel stabilization allowable space, the allowable movement space from the second hierarchy, and the command space; and
the third operation-system control platform which receives a request from the third determination-system control platform and transmits a control request to the operation-system devices, and receives information from the operation-system devices and transmits a second allowable movement space to the second hierarchy,
wherein the plurality of control functions are provided by being divided into (i) the second and third cognition-system control platforms, (ii) the first, second, and third operation-system control platforms, and (iii) the first, second, and third determination-system control platforms to thereby perform the overall control of the vehicle, and
the first hierarchy, the second hierarchy and the third hierarchy are interconnected from each operation-system control platform at a lower level to each determination-system control platform at a higher level, and from each operation-system control platform at a higher level to each determination-system control platform at a lower level.

2. A vehicle control information conveyance structure, a vehicle control device using the conveyance structure, and a vehicle control simulator using the conveyance structure, the conveyance structure being for information of an overall control of a vehicle having a plurality of control functions, wherein
control levels are hierarchically structured in correspondence with controlled objects of the plurality of control functions,
each of the plurality of hierarchies is provided with a cognition-system control platform which recognizes information on inside and outside of the vehicle, an operation-system control platform for coordinating movement of the vehicle itself, and a determination-system control platform which transmits requests to the cognition-system control platform an/or the operation-system control platform based on information from the cognition-system control platform and the operation-system control platform and commands arising from driver's operation,
the plurality of control functions are provided by being divided into, of the plurality of hierarchies, (i) the cognition-system control platforms, (ii) the operation-system control platforms, and (iii) the determination-system control platforms to thereby perform the overall control of the vehicle;
of the plurality of hierarchies, a first hierarchy that is in charge of parts related to a basic performance of the vehicle, which includes running, turning, and stopping of the vehicle, is not provided with the determination-system control platform or the cognition-system control platform, but the first hierarchy is provided with a power source coordinator which adjusts power of an engine in correspondence with a plurality of requests,
of the plurality of hierarchies, a second hierarchy as a hierarchy immediately higher than the first hierarchy ranks at least the automatic transmission as an operation-system device in the second hierarchy,
the operation-system control platform in the first hierarchy of the plurality of hierarchies generates an automatic transmission control fundamental space as basic information for controlling, in the second hierarchy, the operation-system devices in the second hierarchy,
the determination-system control platform in the second hierarchy generates requests to the operation-system devices in the second hierarchy, using at least information of the automatic transmission control fundamental space from the first hierarchy and information of the allowable security space from the cognition-system control platform in the second hierarchy, and
the first hierarchy and the second hierarchy are interconnected from each operation-system control platform at a lower level to each determination-system control platform at a higher level, and from each operation-system control platform at a higher level to each determination-system control platform at a lower level.

3. The vehicle control information conveyance structure, the vehicle control device using the conveyance structure, and the vehicle control simulator using the conveyance structure according to claim 2, wherein
the determination-system control platform in the second hierarchy receives a state of at least one of an accelerator operation, a brake operation, and a steering wheel operation of the driver as a driver command, generates a command space which defines a control request to the operation-system devices based on the driver command, and generates a request to the operation-system devices in the second hierarchy based on an overlap portion of the command space, information of the automatic transmission control fundamental space from the first hierarchy, and the information of the allowable security space from the cognition-system control platform in the second hierarchy.

4. The vehicle control information conveyance structure, the vehicle control device using the conveyance structure, and the vehicle control simulator using the conveyance structure according to claim 3, wherein
the automatic transmission control fundamental space transmitted from the first hierarchy to the determination-system control platform in second hierarchy is related to the allowable movement space in which the scope of control which can be implemented by the automatic transmission is defined based on at least a present driving state of the engine.

5. The vehicle control information conveyance structure, the vehicle control device using the conveyance structure, and the vehicle control simulator using the conveyance structure according to claim 2, wherein
a control unit of the operation-system control platform in the second hierarchy of the plurality of hierarchies transmits, to the control platform in the first hierarchy, information of a wheel stabilization control fundamental space based on an operating state of the operation-system devices in the second hierarchy.

6. The vehicle control information conveyance structure, the vehicle control device using the conveyance structure, and the vehicle control simulator using the conveyance structure according to claim 5, wherein
the operation-system control platform generates the wheel stabilization control fundamental space by converting torque required for an axle of the vehicle into engine torque based on at least an operating state of the automatic transmission.

7. The vehicle control information conveyance structure, the vehicle control device using the conveyance structure, and the vehicle control simulator using the conveyance structure according to claim 2, wherein
of the plurality of hierarchies, a third hierarchy that is a hierarchy immediately higher than the second hierarchy ranks at least an antiskid control device as an operation-system device in the third hierarchy.

8. The vehicle control information conveyance structure, the vehicle control device using the conveyance structure, and the vehicle control simulator using the conveyance structure according to claim 7, wherein
the operation-system control platform in the second hierarchy generates a wheel stabilization control fundamental space as basic information for controlling, in the third hierarchy, the operation-system devices in the third hierarchy, and
the determination-system control platform in the third hierarchy generates requests to the operation-system devices in the third hierarchy, using at least information of the wheel stabilization control fundamental space from the second hierarchy and information of the allowable security space from the cognition-system control platform in the third hierarchy.

9. The vehicle control information conveyance structure, the vehicle control device using the conveyance structure, and the vehicle control simulator using the conveyance structure according to claim 8, wherein
the wheel stabilization control fundamental space transmitted from the operation-system control platform in the second hierarchy to the determination-system control platform in the third hierarchy is generated as an allowable movement space corresponding to information on torque transmitted from the axle to each wheel with consideration given to at least a wheel speed, a vehicle body speed, and an efficiency of transmission of engine power from the engine to the automatic transmission.

10. The vehicle control information conveyance structure, the vehicle control device using the conveyance structure, and the vehicle control simulator using the conveyance structure according to claim 7, wherein
the operation-system control platform in the third hierarchy of the plurality of hierarchies transmits, to the determination-system control platform in the second hierarchy, information of a vehicle stabilization control fundamental space based on the operating state of an operation-system device in the third hierarchy.

11. The vehicle control information conveyance structure, the vehicle control device using the conveyance structure, and the vehicle control simulator using the conveyance structure according to claim 10, wherein
a vehicle stabilization control fundamental space transmitted from the operation-system control platform in the third hierarchy to the determination-system control platform in the second hierarchy is generated as an allowable movement space corresponding to information on tire generative force based on at least the wheel speed and the vehicle body speed.

12. The vehicle control information conveyance structure, the vehicle control device using the conveyance structure, and the vehicle control simulator using the conveyance structure according to claim 7, wherein
of the plurality of hierarchies, a fourth hierarchy that is a hierarchy immediately higher than the third hierarchy ranks at least a vehicle behavior control device as an operation-system device in the fourth hierarchy.

13. The vehicle control information conveyance structure, the vehicle control device using the conveyance structure, and the vehicle control simulator using the conveyance structure according to claim 12, wherein
the operation-system control platform in the third hierarchy generates a vehicle stabilization control fundamental space as basic information for controlling the operation-system devices in the fourth hierarchy in the fourth hierarchy, and
the determination-system control platform in the fourth hierarchy generates requests to the operation-system devices in the fourth hierarchy, using at least information of the vehicle stabilization control fundamental space in the third hierarchy and information of the allowable security space from the cognition-system control platform in the fourth hierarchy.

14. The vehicle control information conveyance structure, the vehicle control device using the conveyance structure, and the vehicle control simulator using the conveyance structure according to claim 13, wherein
the vehicle stabilization control fundamental space transmitted from the operation-system control platform in the third hierarchy to the determination-system control platform in the fourth hierarchy is an allowable movement space in which a degree of margin for friction circle of present tire generative force on each wheel is defined so that the vehicle body does not vibrate.

15. The vehicle control information conveyance structure, the vehicle control device using the conveyance structure, and the vehicle control simulator using the conveyance structure according to claim 12, wherein
the operation-system control platform in the fourth hierarchy of the plurality of hierarchies transmits, to the determination-system control platform in the third hierarchy, information of a vehicle safety control fundamental space based on an operating state of the operation-system device in the fourth hierarchy.

16. The vehicle control information conveyance structure, the vehicle control device using the conveyance structure, and the vehicle control simulator using the conveyance structure according to claim 15, wherein
the vehicle safety control fundamental space transmitted from the operation-system control platform in the fourth hierarchy to the determination-system control platform in the third hierarchy is a wheel stabilization command space indicated by a torque request given to each wheel with consideration given to suppression of longitudinal and/or lateral vibration in the vehicle body.

17. The vehicle control information conveyance structure, the vehicle control device using the conveyance structure, and the vehicle control simulator using the conveyance structure according to claim 12, wherein
of the plurality of hierarchies, a fifth hierarchy that is a hierarchy immediately higher than the fourth hierarchy ranks at least a navigation system as a cognition-system device in the fourth hierarchy.

18. The vehicle control information conveyance structure, the vehicle control device using the conveyance structure, and the vehicle control simulator using the conveyance structure according to claim 17, wherein
the fifth hierarchy ranks at least an adaptive cruise control system as an operation-system device in the fifth hierarchy.

19. The vehicle control information conveyance structure, the vehicle control device using the conveyance structure, and the vehicle control simulator using the conveyance structure according to claim 17, wherein the operation-system control platform in the fourth hierarchy generates a vehicle safety control fundamental space as basic information for controlling, in the fifth hierarchy, the operation-system devices in the fifth hierarchy, and the determination-system control platform in the fifth hierarchy generates requests to the operation-system devices in the fifth hierarchy, using at least information of the vehicle safety control fundamental space from the fourth hierarchy and information of the allowable security space from the cognition-system control platform.

20. The vehicle control information conveyance structure, the vehicle control device using the conveyance structure, and the vehicle control simulator using the conveyance structure according to claim 19, wherein the vehicle safety control fundamental space transmitted from the operation-system control platform in the fourth hierarchy to the determination-system control platform in the fifth hierarchy is an allowable movement space based on requests to the operation-system devices required for stabilizing the vehicle.

21. The vehicle control information conveyance structure, the vehicle control device using the conveyance structure, and the vehicle control simulator using the conveyance structure according to claim 19, wherein the operation-system control platform in the fifth hierarchy of the plurality of hierarchies transmits, to the determination-system control platform in the fourth hierarchy, information of a vehicle stabilization command space based on an operating state of the operation-system device in the fifth hierarchy.

22. The vehicle control information conveyance structure, the vehicle control device using the conveyance structure, and the vehicle control simulator using the conveyance structure according to claim 21, wherein the vehicle stabilization command space transmitted from the operation-system control platform in the fifth hierarchy to the determination-system control platform in the fourth hierarchy is generated using at least information from the navigation system.

23. A vehicle control information conveyance structure, a vehicle control device using the conveyance structure, and a vehicle control simulator using the conveyance structure, the conveyance structure being for control information of a vehicle having a plurality of control functions, the conveyance structure comprising:

a first sensor which detects and outputs information of outside of the vehicle; an information system constituent element provided with information of surroundings of the vehicle:

a cognition-system control platform having an allowable security space setting means which establishes an allowable security space of a vehicle body, or an allowable range of movement of the vehicle body, based on information from the first sensor and/or the information provided in the information system constituent element;

a second sensor which detects and outputs an operating state of an actuator operated by an occupant and a third sensor comprising a sensor which detects and outputs the state of the vehicle body;

an operation-system control platform having an allowable movement space setting means which establishes an allowable range within which the vehicle body is allowed to move as an allowable movement space of the vehicle body based on information from the second sensor and/or the third sensor; and a determination-system control platform having a determination control space in which information of the allowable security space and the allowable movement space is received from the cognition-system control platform and the operation-system control platform, and control requests conveyed to the cognition-system control platform and the operation-system control platform are set, wherein:

the second sensor detects a state of at least one of an accelerator operation, a brake operation, and a steering wheel operation of the driver; and the determination-system control platform receives a result of detection from the second sensor, generates a command space which indicates a state of an driver command, and generates a control request based on the allowable security space, the allowable movement space, and the command space; and with respect to the determination control space, an overlap portion of the allowable security space, the allowable movement space, and the command space is taken as a control request feasible range, and control requests to the operation-system control platform and/or the cognition-system control platform are made based on the control request feasible range.

24. A vehicle control information conveyance structure, a vehicle control device using the conveyance structure, and a vehicle control simulator using the conveyance structure, the conveyance structure being for control information of a vehicle having a plurality of control functions, the conveyance structure comprising:

a first sensor which detects and outputs information of outside of the vehicle; an information system constituent element provided with information of surroundings of the vehicle:

cognition-system control platform having an allowable security space setting means which establishes an allowable security space of a vehicle body, or an allowable range of movement of the vehicle body, based on information from the first sensor and/or the information provided in the information system constituent element;

a second sensor which detects and outputs an operating state of an actuator operated by an occupant and a third sensor comprising a sensor which detects and outputs the state of the vehicle body;

an operation-system control platform having an allowable movement space setting means which establishes an allowable range within which the vehicle body is allowed to move as an allowable movement space of the vehicle body based on information from the second sensor and/or the third sensor; and a determination-system control platform having a determination control space in which information of the allowable security space and the allowable movement space is received from the cognition-system control platform and the operation-system control platform, and control requests conveyed to the cognition-system control platform and the operation-system control platform are set, wherein:

the second sensor detects a state of at least one of an accelerator operation, a brake operation, and a steering wheel operation of the driver; and the determination-system control platform receives a result of detection from the second sensor, generates a command space which indicates a state of an driver command, and generates a control request based on the allowable security space, the allowable movement space, and the command space; and when an overlap region of the command space and the allowable security space and/or the allowable movement space does not exist, the determination-system control platform outputs a report request to a reporting device provided with a function of reporting to the driver.

25. A vehicle control information conveyance structure, a vehicle control device using the conveyance structure, and a vehicle control simulator using the conveyance structure, the conveyance structure being for control information of a vehicle having a plurality of control functions, the conveyance structure comprising:

a cognition-system control platform having information system and/or surroundings monitoring system constituent elements;

an operation-system control platform having vehicle movement system constituent elements; and a determination-system control platform which coordinates information from the cognition-system control platform and the operation-system control platform and transmits requests to the cognition-system control platform and the operation-system control platform, wherein the plurality of control functions are distributed among hierarchies which are constructed from a lower level to a higher level relative to an engine, based on how the power of the engine is transmitted to a vehicle body, and are layered from a layer associated with an engine, at a lower level, towards a layer associated with a vehicle body, at a higher level, and all the cognition-system control platform, the operation-system control platform, and the determination-system platform are provided in every hierarchy, and the hierarchies are interconnected from each operation-system control platform at a lower level to each determination-system control platform at a higher level and from each operation-system control platform at a higher level to each determination-system control platform at a lower level, a signal indicating the driver command is transmitted to the determination-system control platforms in the plurality of hierarchies; and the signal indicating the driver command is of an instantaneous command value in a lower-level hierarchy, and of a processed value obtained by carrying out integration for a predetermined time in a higher-level hierarchy.

* * * * *